United States Patent
Shao

(10) Patent No.: US 8,405,767 B2
(45) Date of Patent: Mar. 26, 2013

(54) IMAGE PROCESSING DEVICE

(75) Inventor: Ming Shao, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1012 days.

(21) Appl. No.: 12/268,743

(22) Filed: Nov. 11, 2008

(65) Prior Publication Data

US 2009/0122187 A1     May 14, 2009

(30) Foreign Application Priority Data

Nov. 12, 2007   (JP) ................. 2007-293535

(51) Int. Cl.
*H04N 7/01* (2006.01)
*H04N 11/20* (2006.01)

(52) U.S. Cl. ........ 348/441; 348/452; 348/458; 348/701; 348/443; 348/459; 348/454; 348/448

(58) Field of Classification Search ............... 348/441, 348/452, 458, 701, 443, 459, 454, 448
See application file for complete search history.

(56) References Cited

U.S. PATENT DOCUMENTS

| | | | | |
|---|---|---|---|---|
| 7,349,029 | B1 * | 3/2008 | Chou | 348/448 |
| 7,705,914 | B2 * | 4/2010 | Yamauchi | 348/448 |
| 7,796,189 | B2 * | 9/2010 | Yamauchi | 348/441 |
| 2003/0189667 | A1 | 10/2003 | Chow | |
| 2005/0168653 | A1 * | 8/2005 | Wyman | 348/700 |
| 2006/0187341 | A1 * | 8/2006 | Fuji | 348/441 |
| 2007/0040942 | A1 * | 2/2007 | Yamauchi | 348/558 |
| 2008/0024657 | A1 * | 1/2008 | Matsuoka et al. | 348/448 |
| 2008/0100745 | A1 | 5/2008 | Matsubara | |
| 2008/0158414 | A1 * | 7/2008 | Capps | 348/448 |

FOREIGN PATENT DOCUMENTS

| | | | |
|---|---|---|---|
| CN | 101188724 A | 5/2008 | |
| EP | 1501297 A1 | 1/2005 | |
| EP | 1919211 A2 | 5/2008 | |
| JP | 2004-40815 A | 2/2004 | |
| JP | 2005522951 A | 7/2005 | |
| JP | H18-270912 A | 10/2006 | |
| JP | 2007-129400 A | 5/2007 | |
| KR | 10-2006-0088690 A | 8/2006 | |

OTHER PUBLICATIONS

Japanese Office Action dated Jul. 24, 2012 issued by the Japanese Patent Office in counterpart Japanese Patent Application No. 2007-293535.

\* cited by examiner

*Primary Examiner* — Jefferey Harold
*Assistant Examiner* — Mustafizur Rahman
(74) *Attorney, Agent, or Firm* — Sughrue Mion, PLLC

(57) ABSTRACT

A field pair correlation acquisition part obtains a correlation for six or more fields which are continuous in time series for each field pair formed of two adjacent fields having the same attribute. A first determination part determines an input image as a 2:2 pull-down image based on a determination condition, the determination condition being that a pattern in which the correlation of each of the field pairs of one attribute changes along with a time direction matches a pattern in which the correlation of each of the field pairs of the other attribute changes along with the time direction.

16 Claims, 20 Drawing Sheets

| ARRANGEMENT PATTERN OF CORRELATION VALUE | CHARACTERISTIC OF PIXEL POSITION |
| --- | --- |
| 0000 | STILL |
| 1111 | FAST MOTION |
| 1100<br>0011 | CHARACTERISTIC OF 2:2 PULL-DOWN IMAGE (CHARACTERISTIC POSITION) |
| OTHERS | OTHERS |

Fig. 8

IMAGE PROCESSING DEVICE

BACKGROUND

1. Field of the Invention

The present invention relates to an image processing technique, and more particularly, to a technique determining whether an input image is a 2:2 pull-down image.

2. Description of Related Art

Generally, a film source, such as a movie, includes 24 progressive frames per second. As for the National Television System Committee (NTSC) TV signal, for example, each signal includes 60 interlaced fields per second. As for the Phase Alternating Line (PAL) TV signal, for example, each signal includes 50 interlaced fields per second. Accordingly, in order to broadcast the film source to a TV set, the 24 progressive frames per second need to be converted to the 60 or 50 interlaced fields per second. It is a 3:2 pull-down scheme that is used in converting the signal to the NTSC TV signal, and a 2:2 pull-down scheme used in converting the signal to the PAL TV signal.

The image which is originally generated and taken as a progressive image such as animation or computer graphic (CG) includes 30 frames per second. In this case, the 2:2 pull-down scheme is also employed when the signal is converted into the NTSC TV signal as well.

Hereinafter, the image formed of the interlaced fields is called interlaced image, the interlaced image obtained by the 3:2 pull-down scheme based on the progressive image is called 3:2 pull-down image, and the interlaced image obtained by the 2:2 pull-down scheme based on the progressive image is called 2:2 pull-down image.

When the interlaced image is reproduced by an output device of progressive scheme such as liquid crystal television, Interlace to Progressive Conversion (IPC) needs to be performed in a reproducing side. In this case, it is possible to reproduce the interlaced image obtained by the pull-down scheme with high quality by determining whether the interlaced image is originally interlaced image or the interlaced image obtained by the pull-down scheme.

The 3:2 pull-down scheme converts two 24 Hz frames into five 60 Hz fields, for example. More specifically, one field is repeated to form three fields from a first frame of two continuous frames of the film source while two fields are formed from a second frame. The 3:2 pull-down scheme extracts from the first frame a top field having odd lines and a bottom field having even lines, and then re-extracts the top field. After that, the 3:2 pull-down scheme extracts another bottom field and another top field from the second frame.

When the 60 Hz field image such as NTSC scheme is reproduced by the progressive scheme, a reproducing side obtains the complete progressive frames before the 3:2 pull-down conversion, through a combination of the two fields of the interlaced fields if the reproducing side recognizes the input image as the 3:2 pull-down image. Accordingly, the reproducing side can obtain original images having a high quality which is the same as the image before the pull-down conversion (Japanese Unexamined Patent Application Publication No. 2004-40815).

The 2:2 pull-down scheme is a scheme of extracting two fields from one frame. More specifically, as shown in FIG. 18, the 2:2 pull-down scheme extracts from each frame of the progressive image a top field having odd lines first and then a bottom field having even lines. In FIG. 18, the shading part is the part omitted in the extracting operation.

When the interlaced image is reproduced by the progressive scheme, a reproducing side can obtain the image which is the same as the original progressive image through a combination of the top fields and the bottom fields as shown in the lower part in FIG. 18 if the reproducing side recognizes the input image as the 2:2 pull-down image. Accordingly, the reproducing quality can be increased.

There have been suggested various schemes for determining whether the input image is the 2:2 pull-down image.

For example, in a case of the PAL TV image which is not the 2:2 pull-down image, there is a time difference of 20 ms between the fields. Therefore, as shown in FIG. 19, the correlation is low between the two fields adjacent to each other on a time basis. On the other hand, in FIG. 20, the correlation between the fields adjacent to each other on the time basis is obtained based on the fact that the correlation between two fields (top field and bottom field) generated from one frame is higher than the correlation between the two fields and a field generated by a different frame, so as to determine the input image in which the correlation patterns of "high, low, high, low, . . . " are repeated as the 2:2 pull-down image.

Further, Japanese Unexamined Patent Application Publication No. 2007-129400 discloses a technique of detecting a 2:2 pull-down image by dividing a field into a plurality of blocks and performing motion compensation to detect a most reliable motion vector between two fields of identical attribute continuous in each block, and comparing motion vector of continuous odd field and even field. The term "attribute" indicates whether the field is the top field or the bottom field; the odd fields have the same attribute and the even fields have the same attribute.

SUMMARY

The technique of determining whether the input image is the 2:2 pull-down image by calculating the pattern of the correlation between the fields adjacent to each other on the time basis is based on the fact that the correlation between two fields generated from one frame is higher than the correlation between the two fields and a field generated from a different frame. However, the present inventors have found a problem that, since the top field is formed of the odd lines and the bottom field is formed of the even lines, the correlation is not always high even with the two fields generated from one frame. Especially, when the image includes a picture where there is a change in a vertical direction or the image with motion in an edge portion, the correlation between the two fields generated from one frame becomes low. For example, in the two fields generated by the frame of a character "A" shown in FIG. 18, only the bottom field includes the horizontal line of the character "A"; therefore, the correlation between the two fields becomes low. In such a case, the detection rate of the 2:2 pull-down image becomes low.

There is also a case in which different portions make different motions in one frame of the progressive image. On the other hand, the technique disclosed in Japanese Unexamined Patent Application Publication No. 2007-129400 is based on the motion vector of the block which is a part of the frame. Therefore, when there are multiple blocks making different motions with each other included in the frame, the determination of the 2:2 pull-down image is difficult. Further, this technique requires motion compensation; therefore, complex calculations need to be made.

A first exemplary aspect of an embodiment of the present invention is an image processing device determining whether the input image is the 2:2 pull-down image. The image processing device includes a field pair correlation acquisition part and a first determination part.

The field pair correlation acquisition part obtains a correlation for a field group Gt formed of a field Ft of a timing t and five or more fields F(t−1) (i=1 to m, m≧5) which are continuous with the field Ft in time series in an input image for each field pair Pj (j=t to "t−m+2") formed of two adjacent fields having the same attribute.

The first determination part determines the input image as a 2:2 pull-down image based on a determination condition, the determination condition being that a pattern in which the correlation of each of the field pairs of one attribute changes along with a time direction matches a pattern in which the correlation of each of the field pairs of the other attribute changes along with the time direction.

Even when the above device is replaced with a method or system, or a program operating a computer as the above device, it is still within the scope of the present invention.

According to the technique of the present invention, it is possible to determine whether the input image is the 2:2 pull-down image with accuracy.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 8 is a diagram showing a relation between a characteristic of a pixel position and an arrangement pattern of a correlation value;

DETAILED DESCRIPTION OF THE EXEMPLARY EMBODIMENTS

Before describing the exemplary embodiment of the present invention, principles of the technique according to the present invention will be described.

Figure 1:
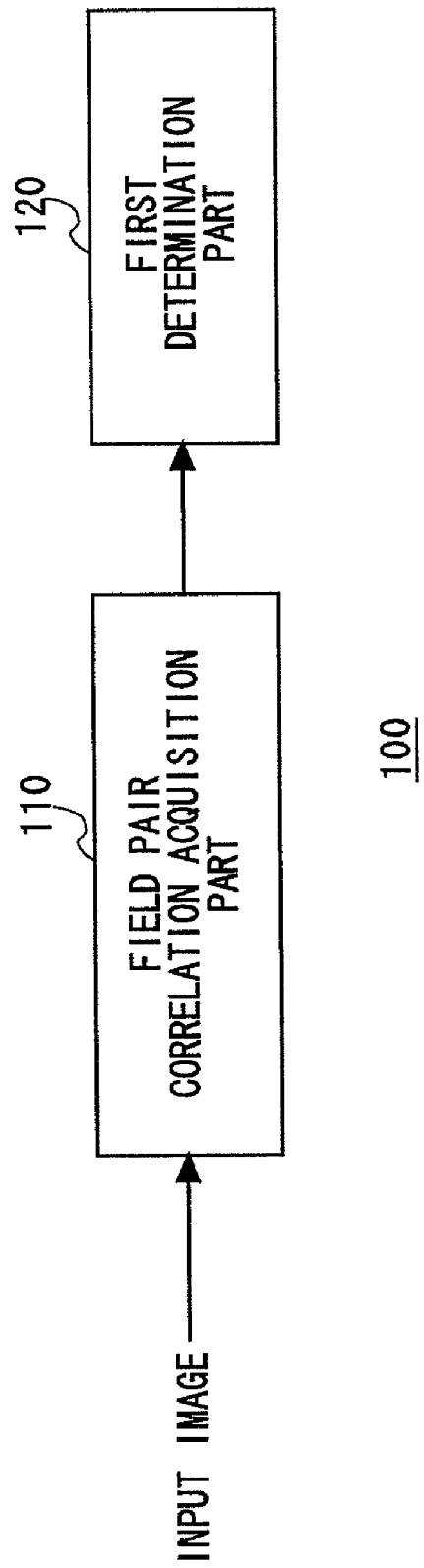
FIG. 1 is a schematic diagram of an image processing device for describing a technique according to the present invention.

FIG. 1 is a schematic diagram of an image processing device 100 according to the technique of the present invention. The image processing device 100 includes a field pair correlation acquisition part 110 and a first determination part 120.

The field pair correlation acquisition part 110 obtains correlation for six or more continuous fields of an input image which is an interlaced image for each field pair formed of two adjacent fields having the same attribute.

The field of the interlaced image has two attributes of a top field and a bottom field, and fields of two attributes are alternately input. Therefore, a field Ft of a timing t and a field F(t−2) two fields before the field Ft, and the field Ft and a field F(t+2) two fields after the field Ft are the two adjacent fields having the same attribute. In the following description, the term "field pair" is used to mean "two adjacent fields having the same attribute", and the attributes of the two fields forming the field pair is the attributes of the field pair.

Figure 2:
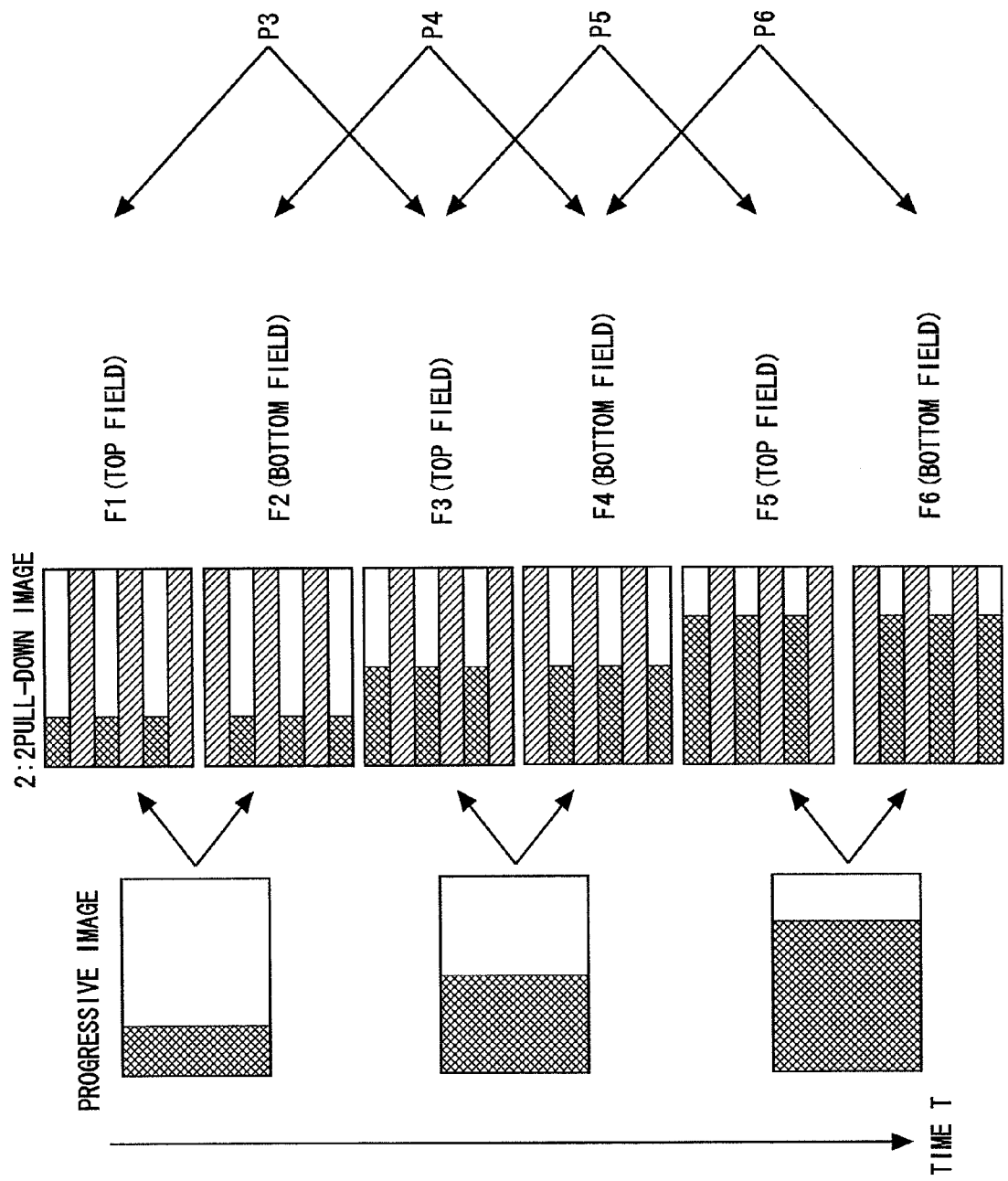
FIG. 2 is a diagram for describing principles of the image processing device shown in FIG. 1.

FIG. 2 shows an example of continuous six fields F1 to F6 in a 2:2 pull-down image. In FIG. 2, areas around the edges of the scene in which the object moves from left to right of the screen are enlarged. As shown in FIG. 2, a top field F1 and a bottom field F2 in the 2:2 pull-down image are formed of odd lines and even lines of one frame of an original progressive image, respectively, and the same explanation can be made on a top field F3 and a bottom field F4, and a top field F5 and a bottom field F6.

In the six fields shown in FIG. 2, there are four field pairs P3 to P6 of F1 and F3, F2 and F4, F3 and F5, F4 and F6. P3 and P5 are top field pairs formed of the top fields, and P4 and P6 are bottom field pairs formed of the bottom fields.

The field pair correlation acquisition part 110 obtains the correlation between the two fields forming the field pair to obtain the correlation for each field pair for the four field pairs P3 to P6.

As shown in FIG. 2, the fields F1 and F2 are formed of the odd lines and the even lines in one frame, respectively. The fields F3 and F4 are formed of the odd lines and the even lines in the next frame, respectively. Therefore, the change from the field F1 to the field F3 due to the movement of the object matches the change from the field F2 to the field F4. In the same way, the change from the field F3 to the field F5 matches the change from the field F4 to the field F6.

In summary, the change pattern of the field F1-F3-F5 matches the change pattern of the field F2-F4-F6.

The change pattern of the field F1-F3-F5 can be indicated by the change pattern of the correlation of the field pairs P3 and P5, and the change pattern of the field F2-F4-F6 can be indicated by the change pattern of the correlation of the field pairs P4 and P6. Therefore, in a case of the 2:2 pull-down image, the pattern in which the correlation of the field pairs having one of the attributes of the field pairs of two types of attributes changes along with the time direction matches the pattern in which the correlation of the field pairs having the other attribute changes along with the time direction.

Now, the description will be made on a case of the interlaced image which is not the 2:2 pull-down image (hereinafter referred to as non 2:2 pull-down image) such as a PAL scheme. The scene shown in FIG. 2 will be taken as an example for the sake of easier comparison.

Figure 3:
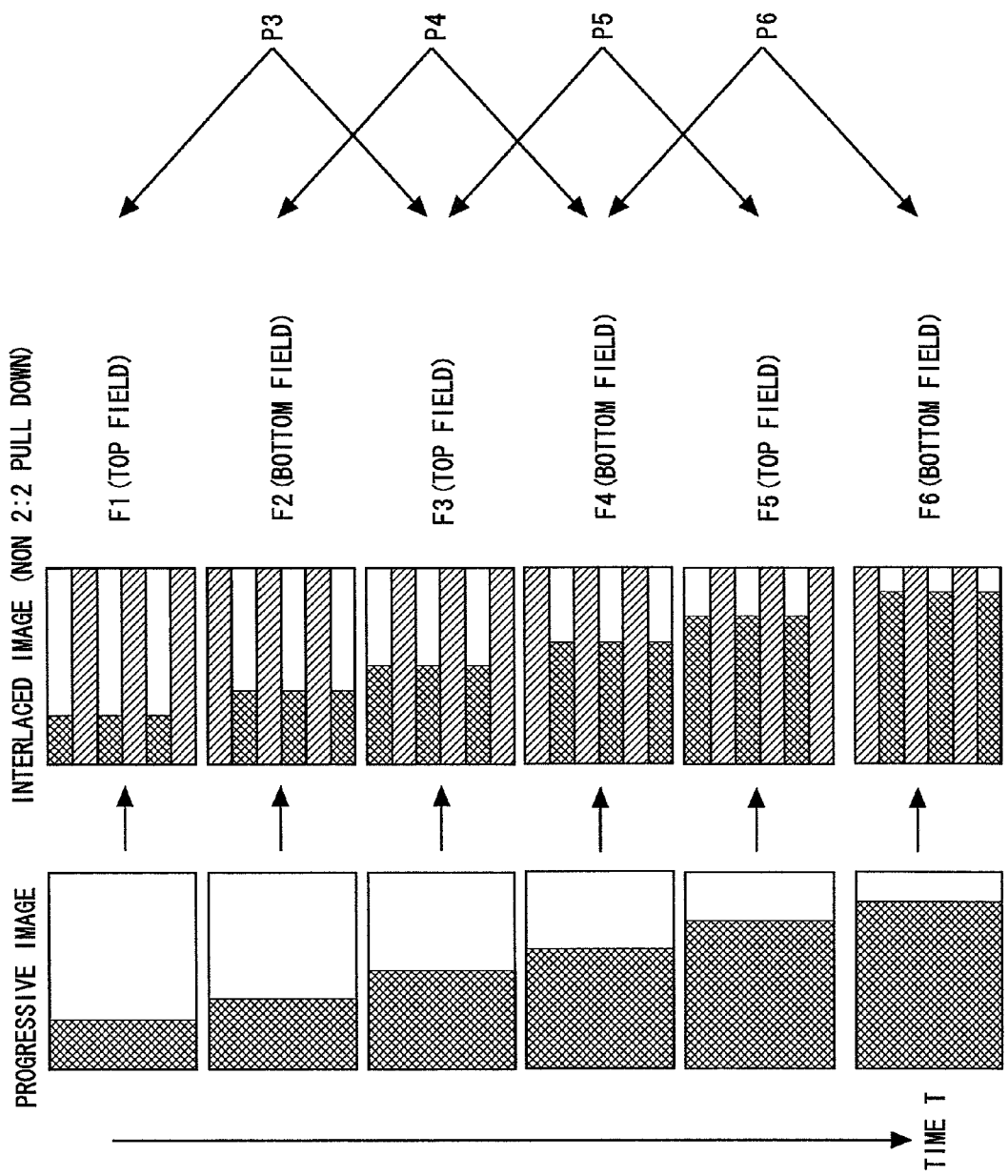
FIG. 3 is another diagram for describing principles of the image processing device shown in FIG. 1.

FIG. 3 shows six continuous fields F1 to F6 of the non 2:2 pull-down image showing the scene of FIG. 2. As shown in FIG. 3, in this case, the change from the field F1 to the field F3 due to the movement of the object has no relation with the change from the field F2 to the field F4. Similarly, the change from the field F3 to the field F5 has no relation with the change from the field F4 to the field F6.

Therefore, in a case of the non 2:2 pull-down image, there is no relation between the pattern in which the correlation of the field pairs having one attribute of the field pairs of two types of attributes changes along with the time direction and the pattern in which the correlation of the field pairs of the other attribute changes along with the time direction.

Based on the above principles, the first determination part 120 in the image processing device 100 determines the input image as the 2:2 pull-down image when the change pattern of the correlation of the top field pairs (field pairs P3 and P5 in FIGS. 2 and 3) matches the change pattern of the correlation of the bottom field pairs (field pairs P4 and P6 in FIGS. 2 and 3) based on the correlation for each field pair obtained by the field pair correlation acquisition part 110.

Although explanation has been made by taking continuous six fields as an example, any number of fields (six or more) may be used. The accuracy of the determination can be made high as the number of fields increases.

The image processing device 100 obtains the correlation between the adjacent field pairs having the same attribute to compare the change pattern of the correlation of the field pairs between the different attributes. Therefore, it is possible to detect the 2:2 pull-down image even with the picture having vertical lines. Further, since the correlation is obtained in the whole field, it is possible to detect the 2:2 pull-down image even when there are included the portions displaying different motions with each other in the field.

The present inventors improve the above-described technique to improve the accuracy of detecting the 2:2 pull-down image based on the above technique using the characteristics of the 2:2 pull-down image that the change pattern of the correlation of the field pairs of the top field matches the change pattern of the correlation of the field pairs of the bottom field.

Figure 4:
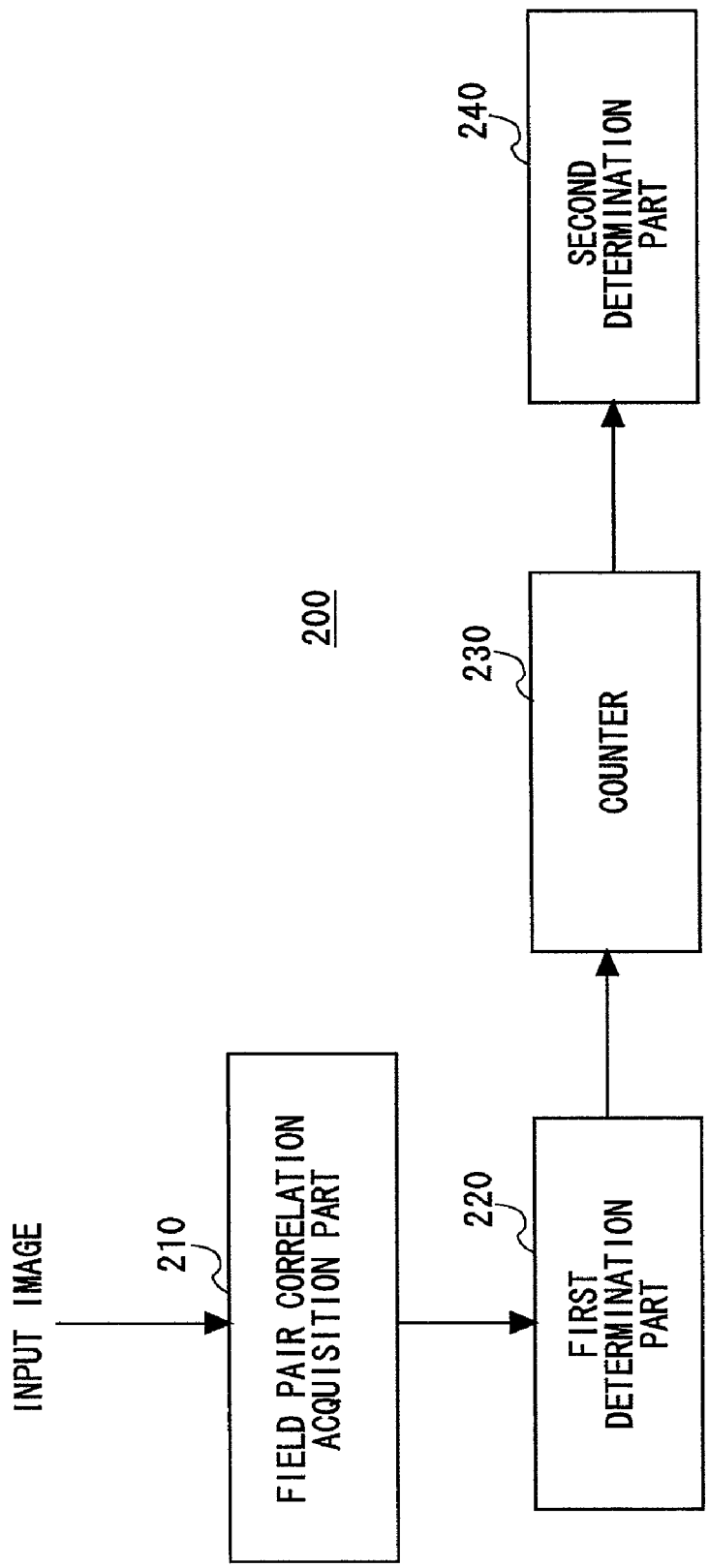
FIG. 4 is a schematic diagram of another image processing device for describing the technique according to the present invention.

FIG. 4 is a schematic diagram of an image processing device 200 obtained by improving the performance of the image processing device 100 shown in FIG. 1. The image processing device 200 includes a field pair correlation acquisition part 210, a first determination part 220, a counter 230, and a second determination part 240.

The field pair correlation acquisition part 210 obtains correlation information indicating existence of the correlation for each pixel position for six or more continuous fields of the input images for each field pair.

Figure 5:
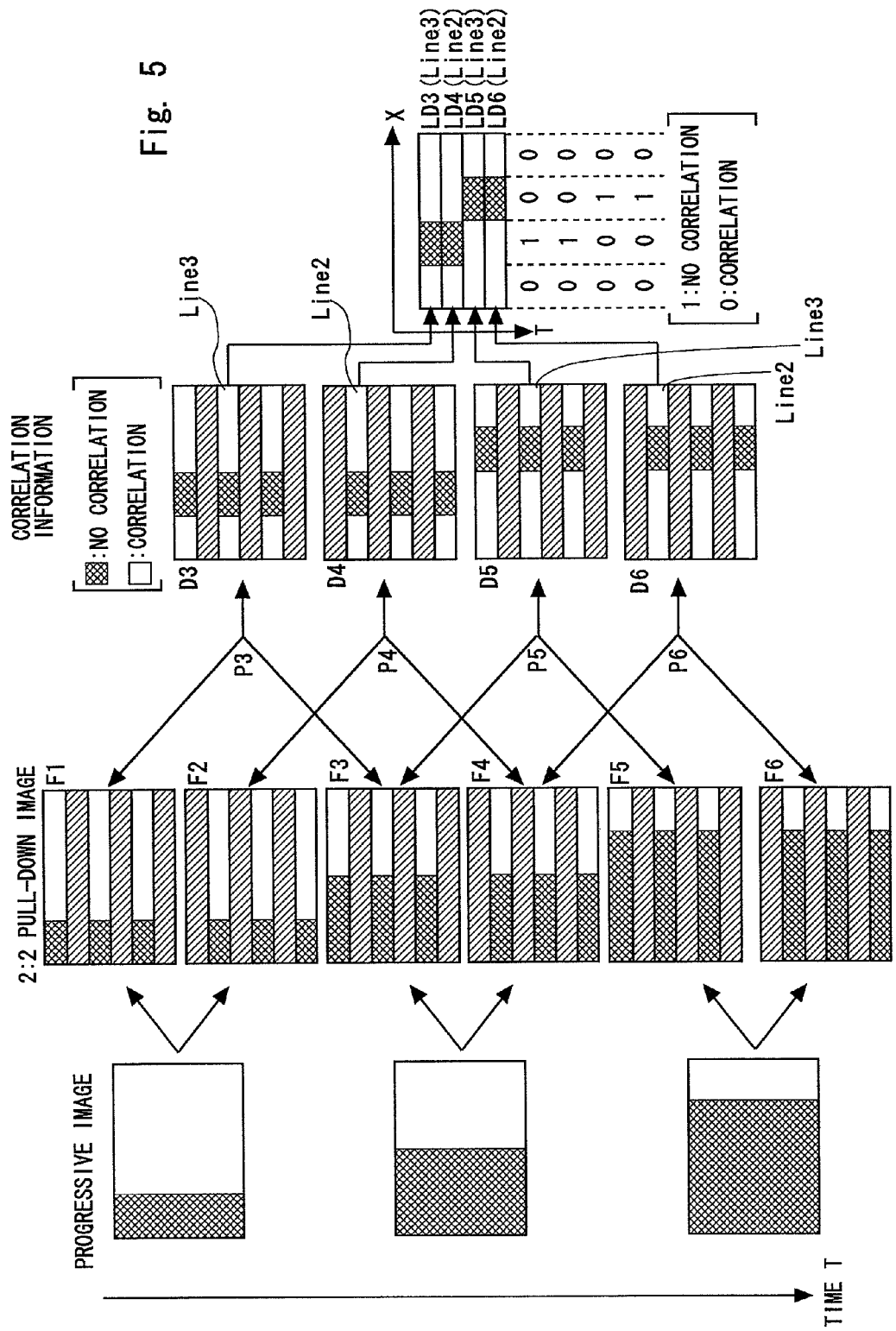
FIG. 5 is a diagram for describing principles of the image processing device shown in FIG. 4.

In FIG. 5, the correlation information D3 to D6 are shown which indicate the existence of the correlation in the pixel position calculated for each pixel position for each of the four field pairs P3 to P6 in the continuous six fields F1 to F6 of the 2:2 pull-down image showing the same scene as the example shown in FIG. 2. For example, the correlation information D3 indicates the existence of the correlation between two fields F1 and F3 forming the field pair P3 for each pixel position, and the correlation information D4 indicates the existence of the correlation between two fields F2 and F4 forming the field pair P4 for each pixel position.

Now, the correlation information LD3 (Line3) of each pixel position of the line 3 in the correlation information D3 obtained from the field pair P3, the correlation information LD4 (Line2) of each pixel position of the upper next line of the line 3 in the correlation information D4 obtained from the field pair P4, the correlation information LD5 (Line3) of each pixel position of the noted line 3 (line 3 (Line3 in FIG. 5)) in the correlation information D5 obtained from the field pair P5, and the correlation information LD6 (Line2) of each pixel position of the upper next line of the line 3 in the correlation information D6 obtained from the field pair P6 are compared for the same pixel position in the X direction.

When the correlation information of "no correlation" and "correlation" are indicated by the correlation values of "1" and "0", respectively, the arrangement patterns of the correlation values include three patterns of "0000", "1100", and "0011" for the LD3 (Line3), LD4 (Line2), LD5 (Line3), and LD6 (Line2) for one pixel position in the X direction. Furthermore, although not shown in the drawing, the arrangement pattern may be "1111" in the fast-motion pixel position. It should be noted that the arrangement pattern "0000" indicates that there is no motion in the pixel position.

When the pixel position in which the position in the X direction is identical and the correlation values obtained for all the field pairs are other than the same value of "0000" or "1111" is noted, the correlation values of the LD3 (Line3) and LD4 (Line2) are the same for the same pixel position in the X direction, and the correlation values of the LD5 (Line3) and LD6 (Line2) are the same for the same pixel position in the X direction. It substantially means that the arrangement pattern of the correlation values of the LD6 (Line2) and LD4 (Line2) matches the arrangement pattern of the correlation values of the LD5 (Line3) and LD3 (Line3) for one pixel position in the X direction.

These results are also the same for the LD3 (Line3), LD4 (Line4), LD5 (Line3), and LD6 (Line4).

Figure 6:
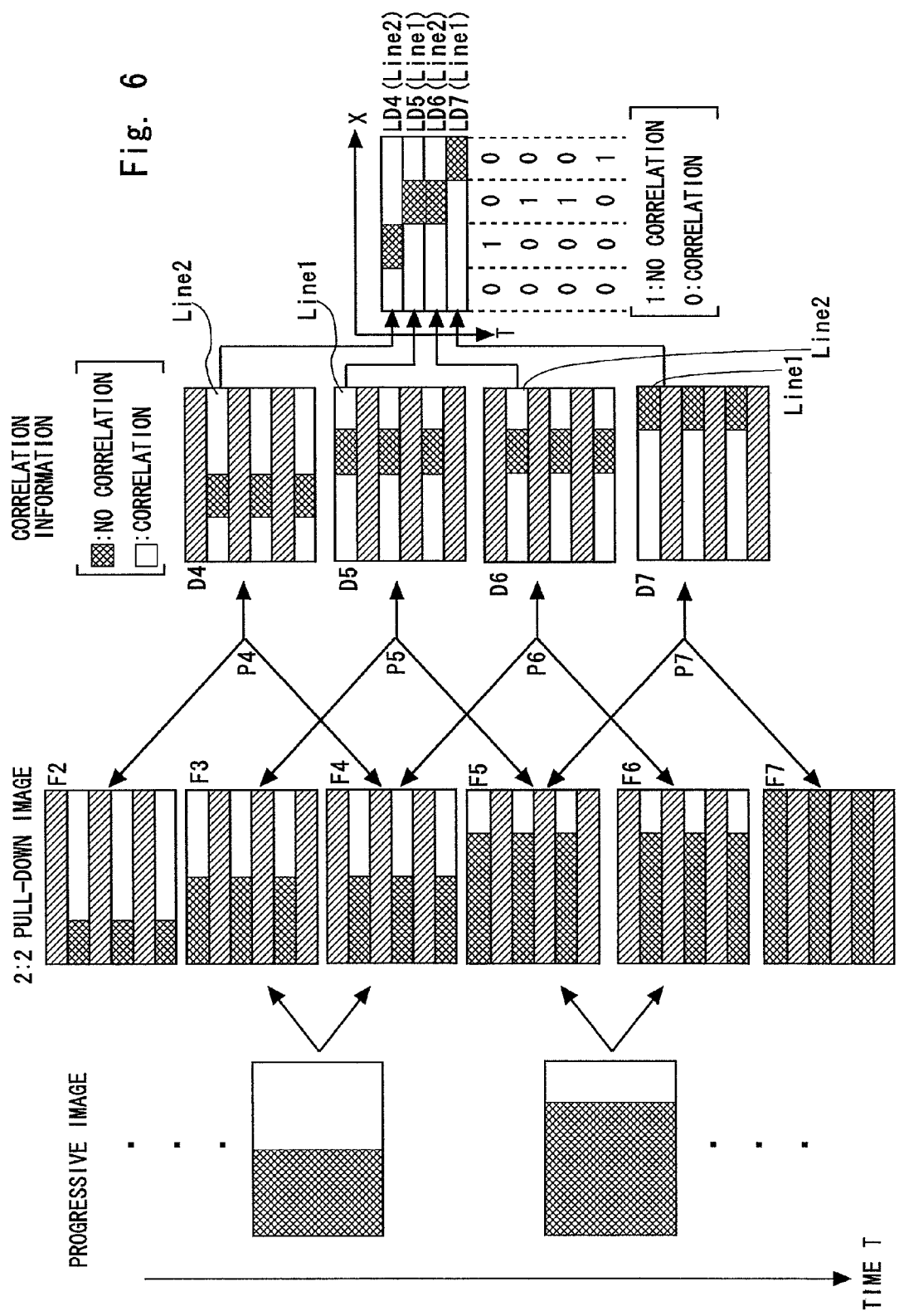
FIG. 6 is another diagram for describing principles of the image processing device shown in FIG. 4.

In FIG. 6, a field F7 (top field) which is the next field of the bottom field F6 when the object continues to move in a right direction is added. The comparison will be made on the correlation information LD4 (Line2) of each pixel position of the line 2 in the correlation information D4 obtained from the field pair P4, the correlation information LD5 (Line1) of the line 1 in the correlation information D5 obtained from the field pair P5, the correlation information LD6 (Line2) of the line 2 in the correlation information D6 obtained from the field pair P6, and the correlation information LD7 (Line1) of the line 1 in the correlation information D7 obtained from the field pair P7 for the same pixel position in the X direction.

As will be seen from FIG. 6, in this case, the arrangement patterns of the correlation values become "0000", "1000", "0110", "0001" for the LD4 (Line2), LD5 (Line1), LD6 (Line2), LD7 (Line1) for the same pixel position of the X direction, and there are few arrangement patterns of "0011" or "1100".

When the pixel position other than the pixel position in which the arrangement pattern becomes "0000" or "1111" is noted, the LD4 (Line2) and LD5 (Line1) have the different correlation values for the same pixel position in the X direction and the LD6 (Line2) and LD7 (Line1) have the different correlation values for the same pixel position in the X direction. It substantially means that the arrangement pattern of the correlation values of the LD7 (Line1) and the LD5 (Line1) does not match the arrangement pattern of the correlation values of the LD6 (Line2) and the LD4 (Line2) for the same pixel position in the X direction.

These results are the same for the LD4 (Line2), LD5 (Line3), LD6 (Line2), and LD7 (Line3).

Figure 7:
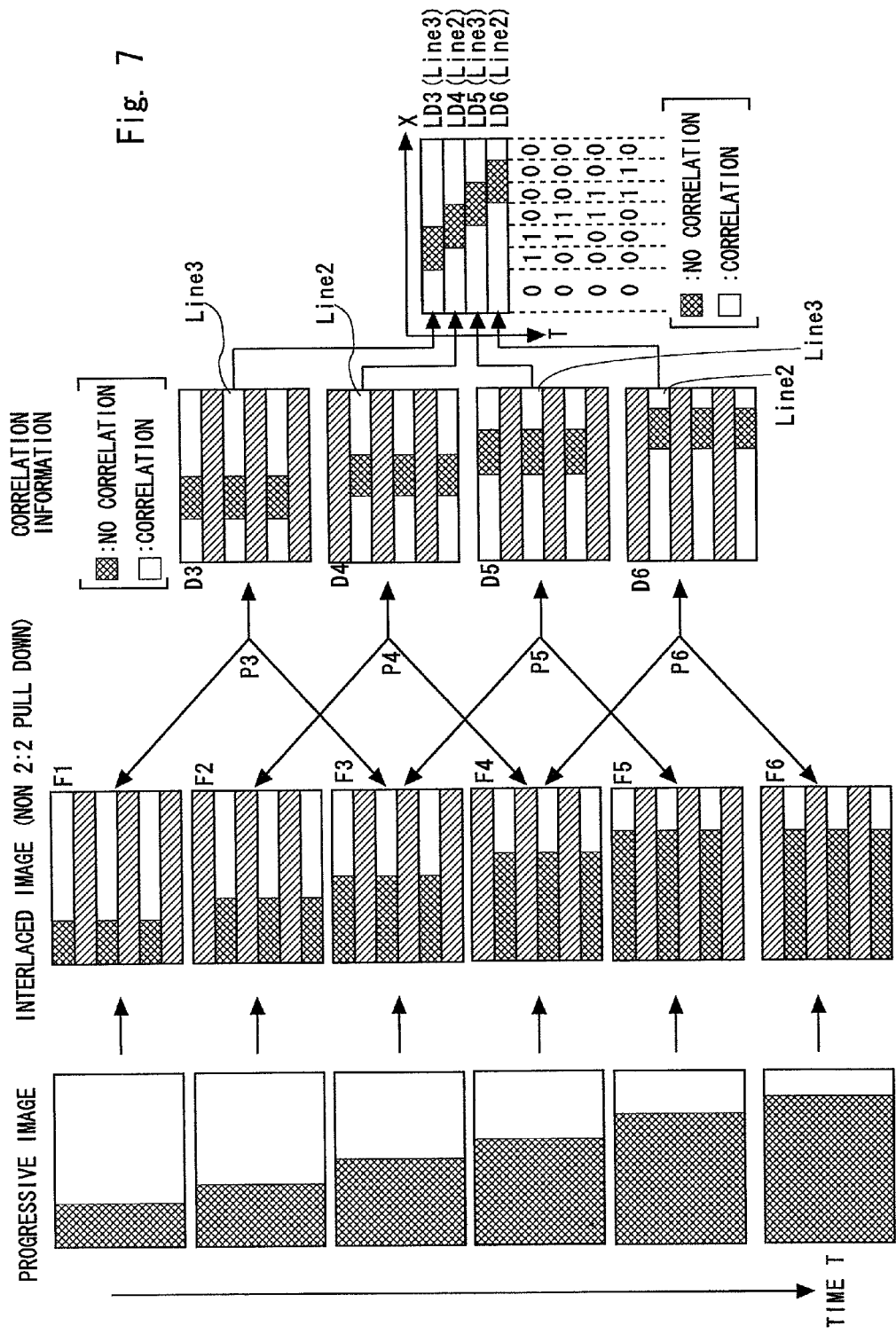
FIG. 7 is another diagram for describing principles of the image processing device shown in FIG. 4.

The arrangement pattern of the correlation value is obtained also for the non 2:2 pull-down image as well. FIG. 7 shows the correlation information D3 to D6 obtained for each pixel position for each of the four field pairs P3 to P6 in the six continuous fields F1 to F6 of the non 2:2 pull-down image showing the same scene as in FIG. 5. As a result of obtaining the arrangement pattern of the correlation value for the LD3 (Line3), LD4 (Line2), LD5 (Line3), LD6 (Line2) for the same pixel position in the X direction by using these correlation information, it is appreciated that there are various arrangement patterns such as "1000,", "1100", "0110", "0011" other than "0000" indicating the still image and "1111" indicating the fast motion (not shown).

When the pixel position in which the position in the X direction is identical and the arrangement pattern is other than "0000" or "1111" is noted, the pixel position having the same correlation values and the pixel position having different correlation values exist in random between the LD3 (Line3) and the LD4 (Line2), and between the LD5 (Line3) and the LD6 (Line2).

These results are the same for the LD3 (Line3), LD4 (Line4), LD5 (Line3), LD6 (Line4).

Further, these results are the same as in the LD4 (Line2), LD5 (Line1), LD6 (Line2), LD7 (Line1) when the field F7 (top field) is added which is the next field of the bottom field F6 when the object continues to move in a right direction.

The types of the pixel positions are classified as shown in FIG. 8 according to the arrangement patterns as described above. More specifically, the pixel position in which the arrangement pattern is "0000" is classified into the "still" pixel position as being motionless in the pixel position, and the pixel position in which the arrangement pattern is "1111" is classified into "fast motion" pixel position as being fast motion in the pixel position. Further, the pixel position in which the arrangement pattern is "1100" or "0011" is classified into the characteristic position including the "characteristic of the 2:2 pull-down image". Further, the pixel position of "other" arrangement patterns other than "0000", "1111", "0011", and "1100" is classified into the "other" pixel position which does not correspond to any three types above.

When the pixel position other than the fast-motion pixel position and the still pixel position is the noted pixel position, the characteristic position becomes the noted pixel position in which A and B have the same value and C and D have the same value of the four correlation values (A, B, C, and D) forming the arrangement pattern. It should be noted that "A and B have the same value and C and D have the same value" substantially means that the arrangement "A, C" matches the arrangement "B, D".

Now, the continuous six fields (F6, F5, ... F1) are the field group G6, and the total number of characteristic positions (total number of characteristic positions) S6 obtained for the field group G6 and the total number of characteristic positions S7 obtained for the field group G7 (F7, F6, ... F2) which is the next group of the field group G6 are compared. In the case of the 2:2 pull-down image, the total number of characteristic positions S6 is larger than S7 and there is a large difference between S6 and S7; on the other hand, in the case of the non 2:2 pull-down image, the total number of characteristic positions S6 and S7 are substantially the same.

When the total number of characteristic positions S7 in the field group G7 (F7, F6, ... F2) is compared with the total number of characteristic positions S8 in the field group G8 (F8, F7, ... F3), the total number of characteristic positions S7 is smaller than S8 and the difference between S7 and S8 is large in the case of the 2:2 pull-down image; on the other hand, the total number of characteristic positions S7 and S8 are substantially the same in the case of the non 2:2 pull-down image.

In summary, when only the continuous two field groups are employed such as the field groups G6 and G7 or the field groups G7 and G8, the input image can be determined as the 2:2 pull-down image when the absolute value of the difference between the total number of characteristic positions obtained for the two field groups or the ratio of the two total number of characteristic positions is equal to or larger than the predetermined threshold value. It should be noted that the threshold value can be predetermined by a simulation and so on so as to be able to reflect the difference between the 2:2 pull-down image and the non-pull-down image or may be dynamically controlled according to the motion of the image. This determination scheme will hereinafter be called scheme A.

Further, the input image can be determined as the 2:2 pull-down image when the magnitude relation between Sj and S(j+1) and the magnitude relation between S(j+1) and S(j+2) are reversed for all the n total number of characteristic positions Sj obtained for three or more continuous field groups Gj (j=t to "t+n", n≧2) such as the field groups G6, G7, G8. When the input image is the non 2:2 pull-down image, there is no such a rule. This determination scheme will hereinafter be called scheme B.

In the scheme B, the number of field groups required for the determination is larger than that of the scheme A; however, there is no need to set the threshold value. Therefore, there is no such a problem that the determination accuracy can be decreased when the setting of the threshold value is inadequate.

Although one field group is formed of the continuous six fields in this exemplary embodiment, the number of fields included in the field group may be any number which is six or more. As the number of fields increases, the accuracy of the determination can be made high.

Referring back to FIG. 4, the description will now be made on the image processing device 200.

The first determination part 220 determines whether each pixel position is the "still" pixel position, "fast motion" pixel position, "characteristic position", or "other" pixel position shown in FIG. 8 for each field group using the correlation information of each field pair obtained by the field pair correlation acquisition part 210.

The counter 230 calculates the total number of the pixel positions determined by the first determination part 220 as "characteristic position" for each field group to output the calculated total number to the second determination part 240 as the total number of characteristic positions.

The second determination part 240 compares the magnitude relation of the total number of characteristic positions of a plurality of continuous field groups to determine whether the input image is the 2:2 pull-down image. Note that one of the scheme A and the scheme B described above is employed in the determination.

The image processing device 200 is obtained by improving the performance of the image processing device 100. Every effect of the image processing device 100 can be obtained with the image processing device 200 as well.

The image processing device 200 obtains the correlation information between the field pair for each pixel position; therefore, it is possible to exclude the still pixel position or the fast-motion pixel position. It is possible to perform the determination with high accuracy even when there are included still and fine backgrounds.

Further, the image processing device 200 does not require the motion compensation employed in the technique of Japanese Unexamined Patent Application Publication No. 2007-129400, and the calculation can be made with a simple operation.

Note that any known scheme can be employed as the technique of obtaining the correlation information for each pixel position in the technique according to the present invention. For example, the motion may be detected for each pixel position for each field pair to obtain the motion parameter indicating the existence of the motion as the correlation information of the pixel position.

Further, any known method can be employed for detecting the motion. For example, the difference between the two fields forming the field pair is obtained for each field pair, and the motion parameter of each pixel position can be obtained by determining the pixel position in which the absolute value of the difference is equal to or more than the predetermined threshold value as "motion" and determining the pixel position in which the absolute value of the difference is less than the threshold value as "motionless".

Based on the above description, explanation will now be made on the specific exemplary embodiment in which the above principles are embodied.

Figure 9:
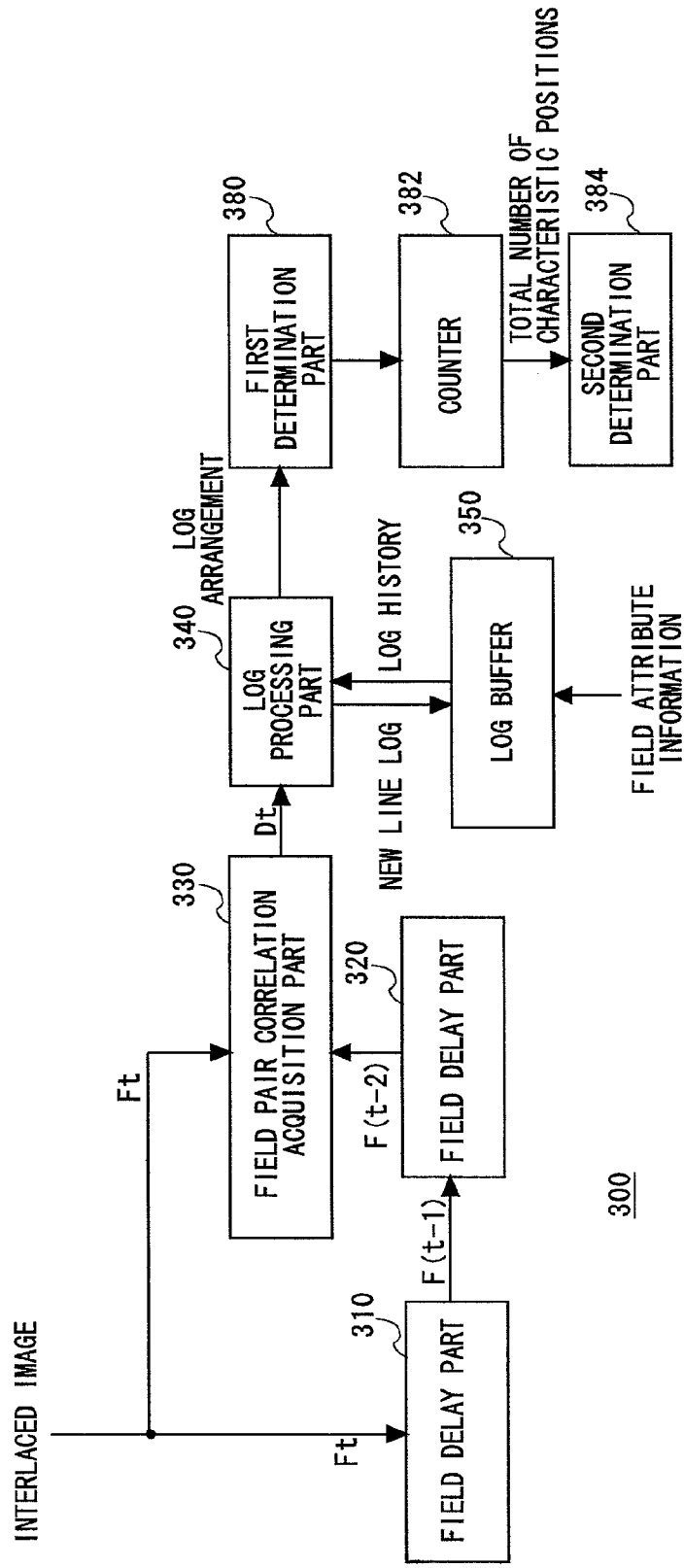
FIG. 9 is a diagram showing the image processing device according to the exemplary embodiment of the present invention.

FIG. 9 is an image processing device 300 according to the exemplary embodiment of the present invention. The image processing device 300 includes a field delay part 310, a field delay part 320, a field pair correlation acquisition part 330, a log processing part 340, a log buffer 350, a first determination part 380, a counter 382, and a second determination part 384.

Each field of the interlaced image is successively input to the field delay part 310 and the field pair correlation acquisition part 330. The image processing device 300 further includes a controller which is not shown, and this controller inputs the field attribute information indicating whether the field which is input is the top field or the bottom field to the log buffer 350.

The field delay part 310 delays the input field by one field interval to output the delayed field to the field delay part 320.

The field delay part 320 delays the field from the field delay part 310 by one field interval to output the delayed field to the field pair correlation acquisition part 330.

More specifically, at timing t, the field Ft and the field F(t−2) two fields before the field Ft are input to the field pair correlation acquisition part 330. These two fields have the same attribute; both of them are top fields or bottom fields. Hereinafter, the field Ft and the field F(t−2) are called field pair Pt, and the field pair formed of the top fields and the field pair formed of the bottom fields are called "top field pair" and "bottom field pair", respectively.

Figure 10:
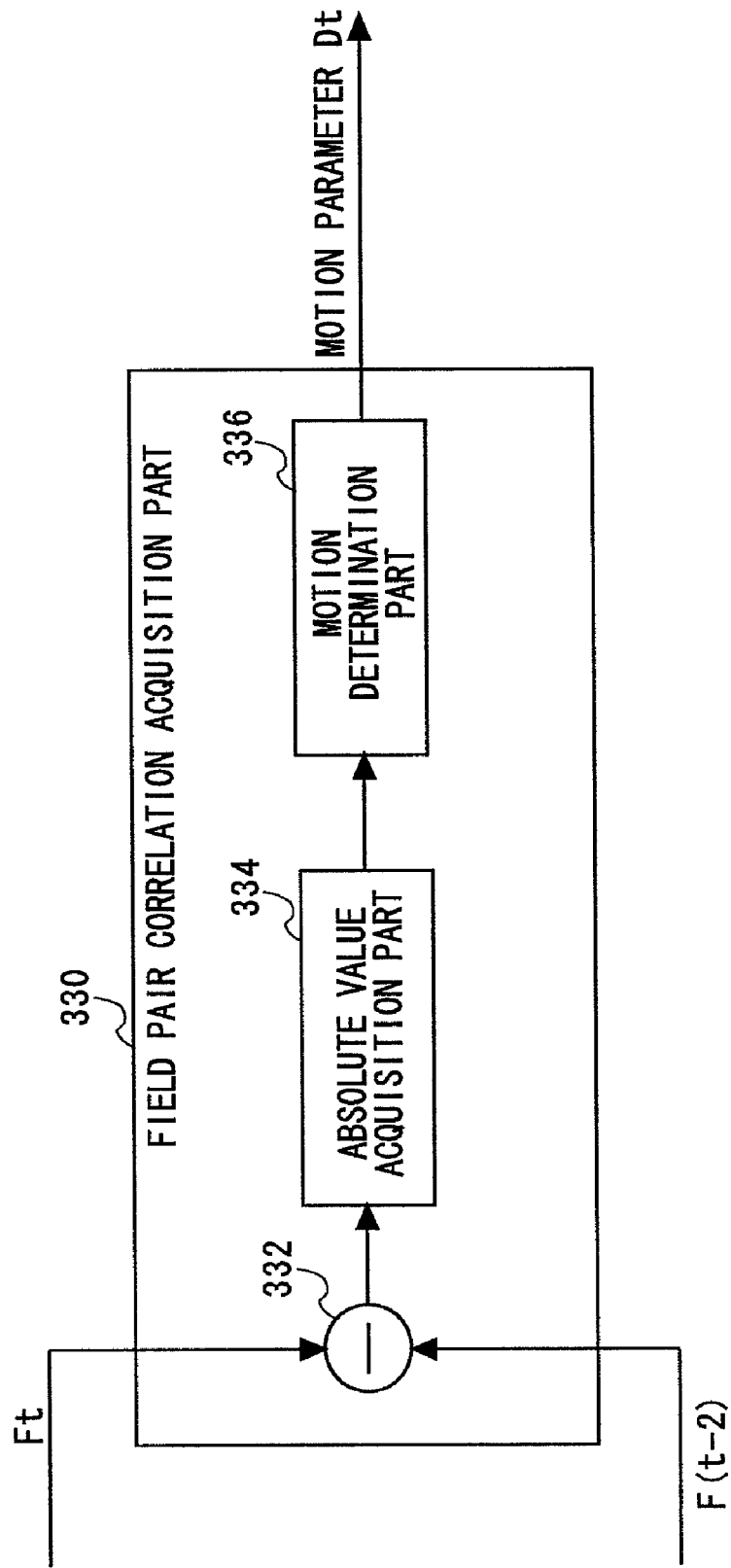
FIG. 10 is a diagram showing a field pair correlation acquisition part in the image processing device shown in FIG. 9.

The field pair correlation acquisition part 330 obtains the correlation information indicating the existence of the correlation for each pixel position for the input field pair Pt. FIG. 10 shows the field pair correlation acquisition part 330.

As shown in FIG. 10, the field pair correlation acquisition part 330 includes a subtractor 332, an absolute value acquisition part 334, and a motion determination part 336.

The subtractor 332 calculates the difference for each pixel position for the field Ft and the field F(t−2) to output the difference to the absolute value acquisition part 334.

The absolute value acquisition part 334 calculates the absolute value of the difference from the subtractor 332 for each pixel position to output the absolute value to the motion determination part 336.

The motion determination part 336 compares the absolute value of each difference from the absolute value acquisition part 334 with the threshold value for determining the existence of the motion. When the absolute value of the difference is equal to or larger than the threshold value, it is determined as "motion" in the pixel position; when the absolute value of the difference is smaller than the threshold value, it is determined as "motionless" in the pixel position. Each of the "motion" and "motionless" is indicated by motion parameter D of the pixel position.

The motion determination part 336 outputs the motion parameter Dt which is calculated for each pixel position for the field pair Pt to the log processing part 340 as the correlation information.

Figure 11:
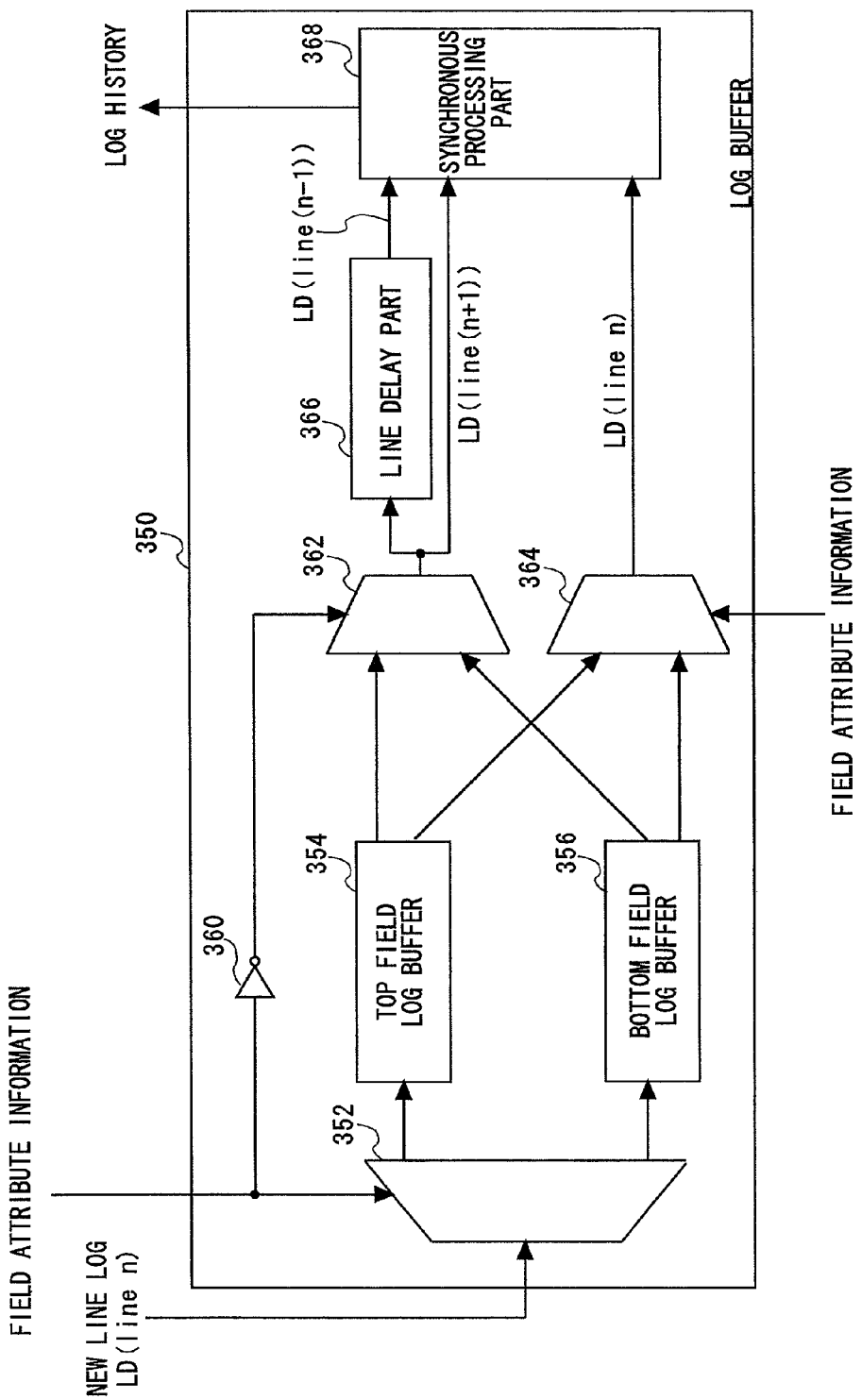
FIG. 11 is a diagram showing a log buffer in the image processing device shown in FIG. 9.

The log buffer 350 will be described first before describing the log processing part 340. As shown in FIG. 11, the log buffer 350 includes a selector 352, a top field log buffer 354, a bottom field log buffer 356, a selector 362, a selector 364, an inverter 360 inverting the field attribute information to input the inverted information to the selector 362, a line delay part 366, and a synchronous processing part 368.

The detailed description of the selector 352 and the update log input from the log processing part 340 to the selector 352 will be described later when the log processing part 340 is described.

Figure 12:
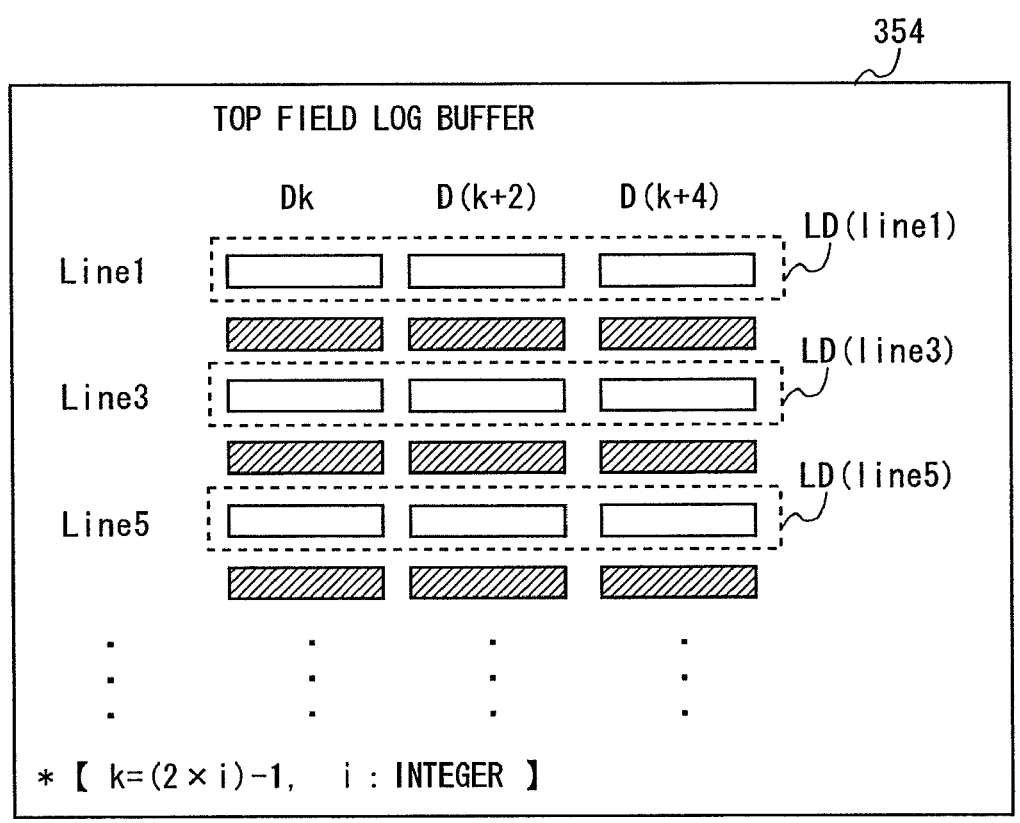
FIG. 12 is a diagram showing an aspect of data stored in a top field log buffer in the log buffer shown in FIG. 11.

The top field log buffer 354 stores the motion parameter D of the previous three top field pairs. FIG. 12 shows an example of the data stored in the top field log buffer 354. As an example, the odd fields are considered to be the top fields. Accordingly, the motion parameter of the odd field pair is stored in the top field log buffer 354.

In the top field, only the odd lines have the pixels; therefore, the top field log buffer 354 stores the motion parameter of the odd lines for each top field pair. In the following description, the arrangement along with the time direction of the motion parameter for the same line is called line log. As shown in FIG. 12, the top field log buffer 354 stores the line logs (LD(line1)), LD(line3), LD(line5), . . . ) of the odd lines of the top field pair.

Figure 13:
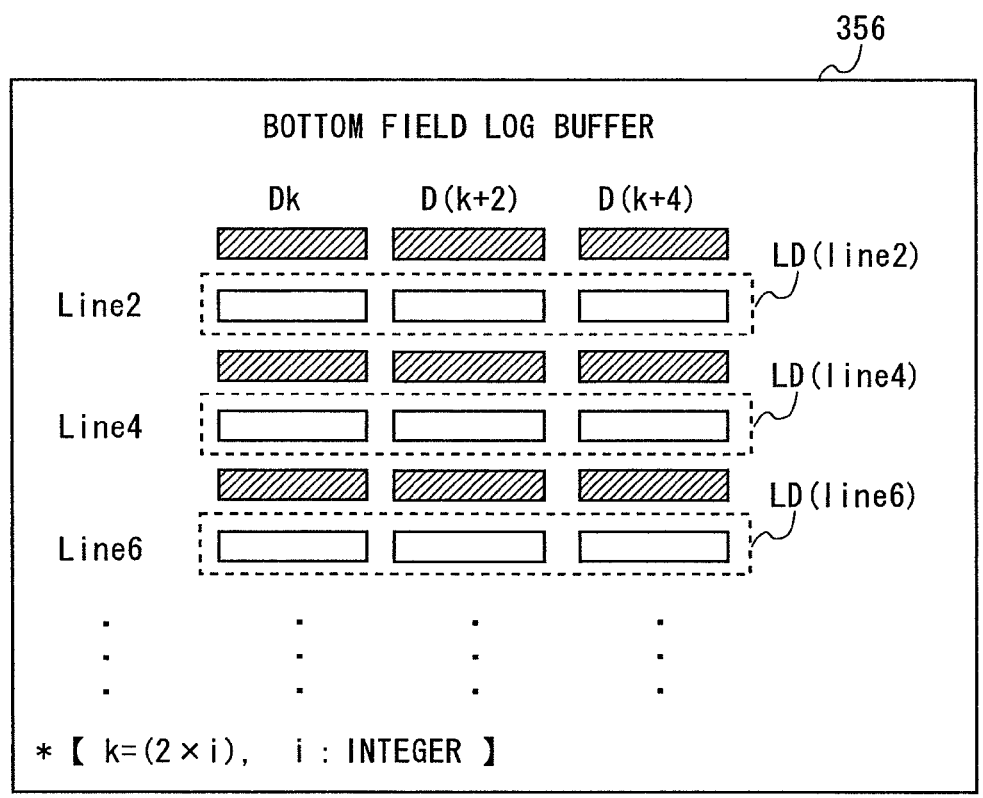
FIG. 13 is a diagram showing an aspect of data stored in a bottom field log buffer in the log buffer shown in FIG. 11.

FIG. 13 shows an example of the data stored in the bottom field log buffer 356. As shown in FIG. 13, the bottom field log buffer 356 stores line logs (LD(line2), LD(line4), LD(line6), . . . ) of the even lines of the previous four bottom field pairs.

The description will be made referring back to FIG. 11. When the line (n) of the field Ft is input to the image processing device 300, the selector 364 selects the line log of the line (n) in the previous motion parameter from the top field log buffer 354 or the bottom field log buffer 356 according to the field attribute information from the controller which is not shown indicating whether the field Ft is the top field or the bottom field to output the selected line log to the synchronous processing part 368. More specifically, when the field Ft is the top field, the line (n) is the odd lines, and then the selector 364 outputs the line log LD (line (n)) in the top field log buffer 354 to the synchronous processing part 368. On the other hand, when the field Ft is the bottom field, the line (n) is the even lines, and the selector 364 outputs the line log LD (line (n)) in the bottom field log buffer 356 to the synchronous processing part 368.

The attribute information of the field Ft is input to the selector 362 after being inverted by the inverter 360. Accordingly, when the field Ft is the top field, the selector 362 outputs the line log from the bottom field log buffer 356 to the synchronous processing part 368 and the line delay part 366; when the field Ft is the bottom field, the selector 362 outputs the line log from the top field log buffer 354 to the synchronous processing part 368 and the line delay part 366. Before outputting the line log, the line log of the line (n+1) which is the lower next line of the line (n) is output.

The line delay part 366 delays the line log from the selector 362 to output the delayed line log to the synchronous processing part 368.

More specifically, when the line (n) of the field Ft is input to the image processing device 300, three line logs are input to the synchronous processing part 368 in the log buffer 350. These three line logs are line log LD (line (n)) formed of the motion parameter of each pixel position of the line (n) obtained from the previous field pair having the same attribute as the field Ft, and line logs LD (line (n−1)) and LD (line (n+1)) which are the upper next and lower next lines of the line (n) obtained from the previous field pair having the different attributes from the field Ft.

The synchronous processing part 368 synchronizes the three line logs to output the synchronized data to the log processing part 340 as the log history.

Figure 14:
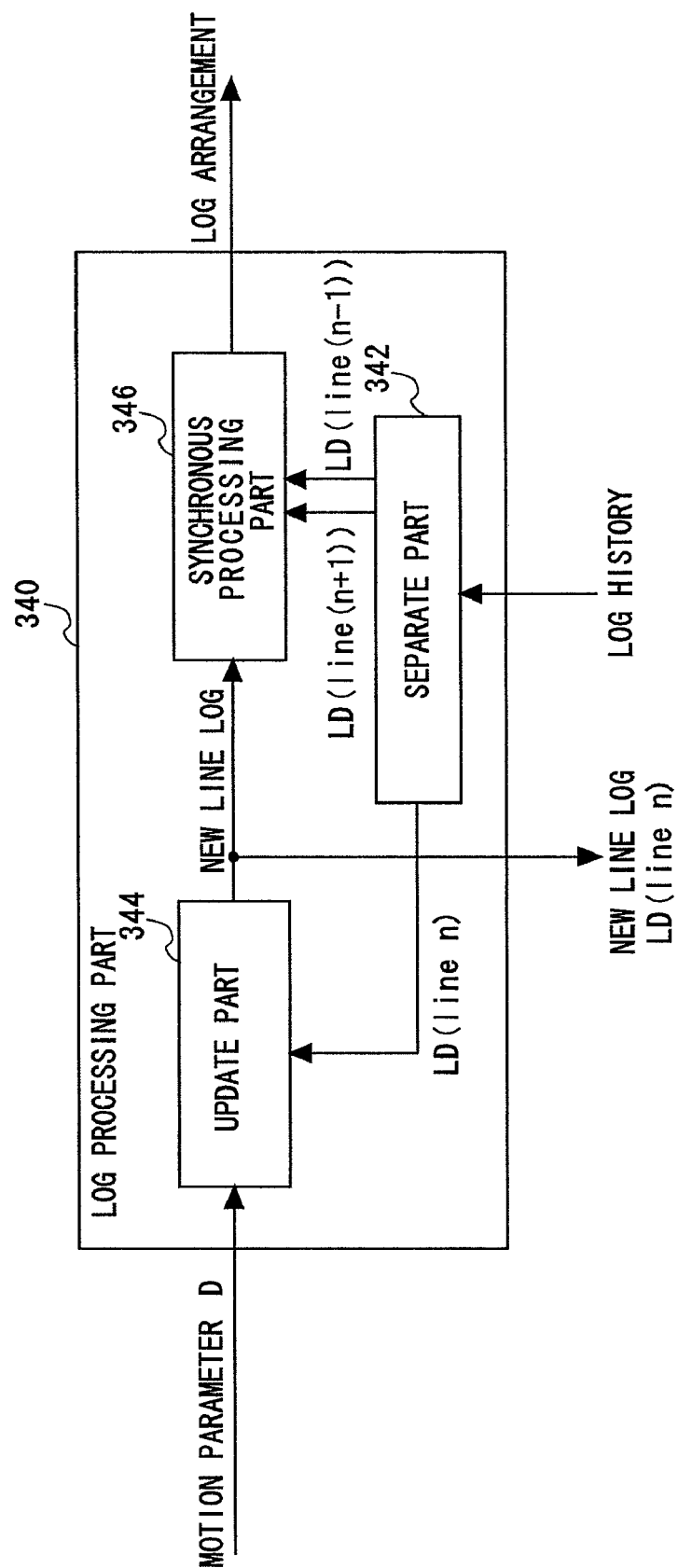
FIG. 14 is a diagram showing a log processing part in the image processing device shown in FIG. 9.

Now, the description will be made on the log processing part 340. As shown in FIG. 14, the log processing part 340 includes a separate part 342, an update part 344, and a synchronous processing part 346.

The separate part 342 separates the log history from the log buffer 350 into three line logs and outputs the line log LD(line (n)) to the update part 344 and the line logs LD(line (n−1)) and LD(line (n+1)) to the synchronous processing part 346.

The update part 344 couples the motion parameter of the line (n) of the field Ft and the line log LD(line (n)) to obtain the new line log or the new line log LD(line (n)) so as to output the new line log LD(line (n)) to the synchronous processing part 346 and the log buffer 350.

The synchronous processing part 346 synchronizes the new line log LD(line (n)) from the update part 344 with the two line logs from the separate part 342 to output the synchronized data to the first determination part 380 as the log arrangement.

Further, the selector 352 in the log buffer 350 stores the new line log LD(line (n)) in one of the top field log buffer 354 and the bottom field log buffer 356 having the same attribute as the field Ft to update the line log of the line (n).

Figure 15:
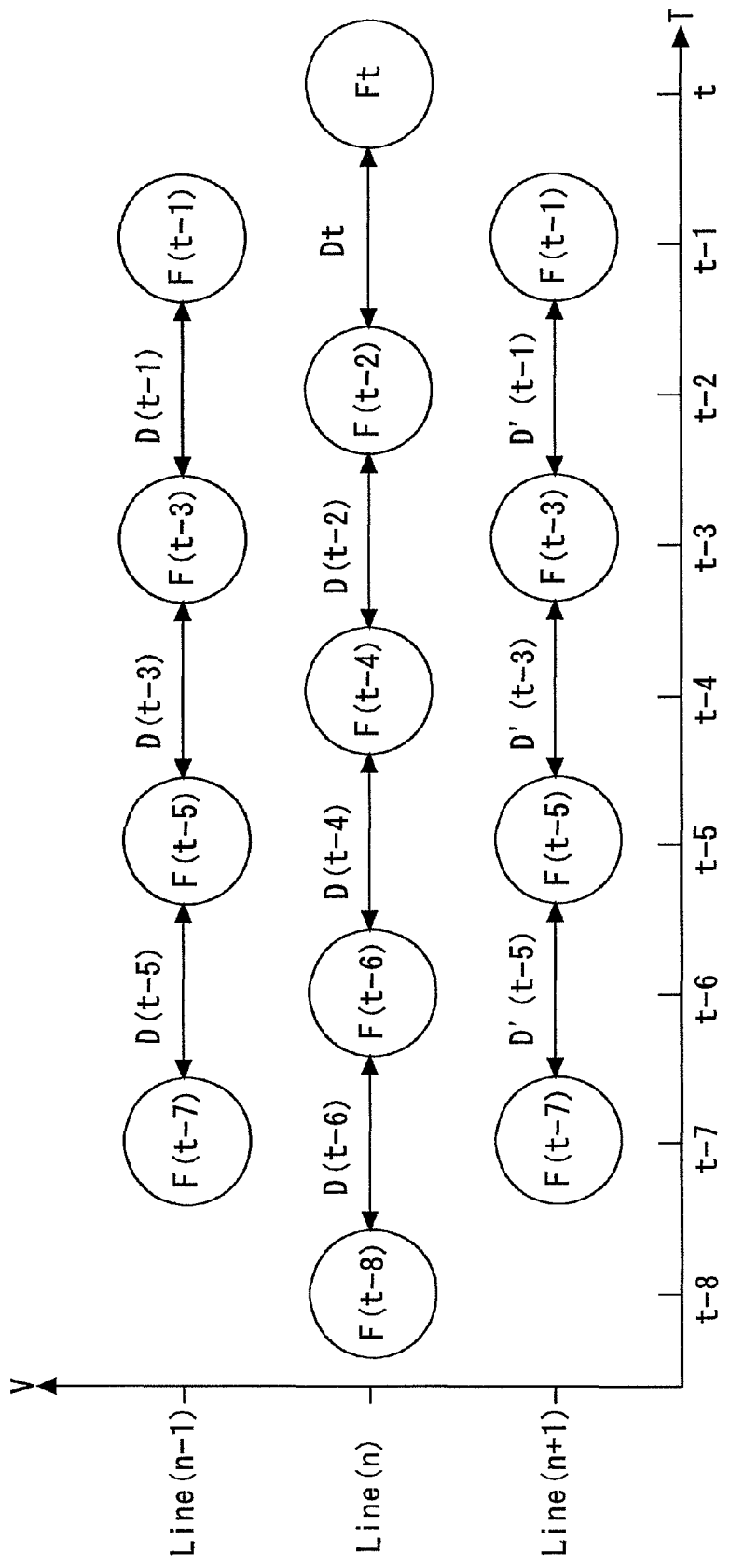
FIG. 15 is a diagram showing a log arrangement output from the log processing part shown in FIG. 14.

FIG. 15 shows a log arrangement output from the log processing part 340 to the first determination part 380. As shown in FIG. 15, the motion parameters Dt, D(t−2), D(t−4), D(t−6) of the line (n) obtained from the field pair having the same attribute as the field Ft, the motion parameters D(t−1), D(t−3), D(t−5) of the line (n−1) which is the upper next line of the line (n), obtained from the field pair having the different attribute from the field Ft, and the motion parameters D'(t−1), D'(t−3), D'(t−5) of the line (n+1), which is the lower next line of the line (n), obtained from the field pair having the different attribute from the field Ft are input to the first determination part 380.

The first determination part 380 determines whether there is a characteristic of the 2:2 pull-down image, or whether the pixel position is the characteristic position in each pixel position for each field group. In the exemplary embodiment, the first determination part 380 performs this determination for each field group formed of eight continuous fields.

The first determination part 380 first performs determination on the field group G(t−1) formed of the fields F(t−1) to F(t−8). At this time, as shown in FIG. 16, the motion parameter other than the motion parameter Dt in the log arrangement from the log processing part 340 is used.

Figure 16:
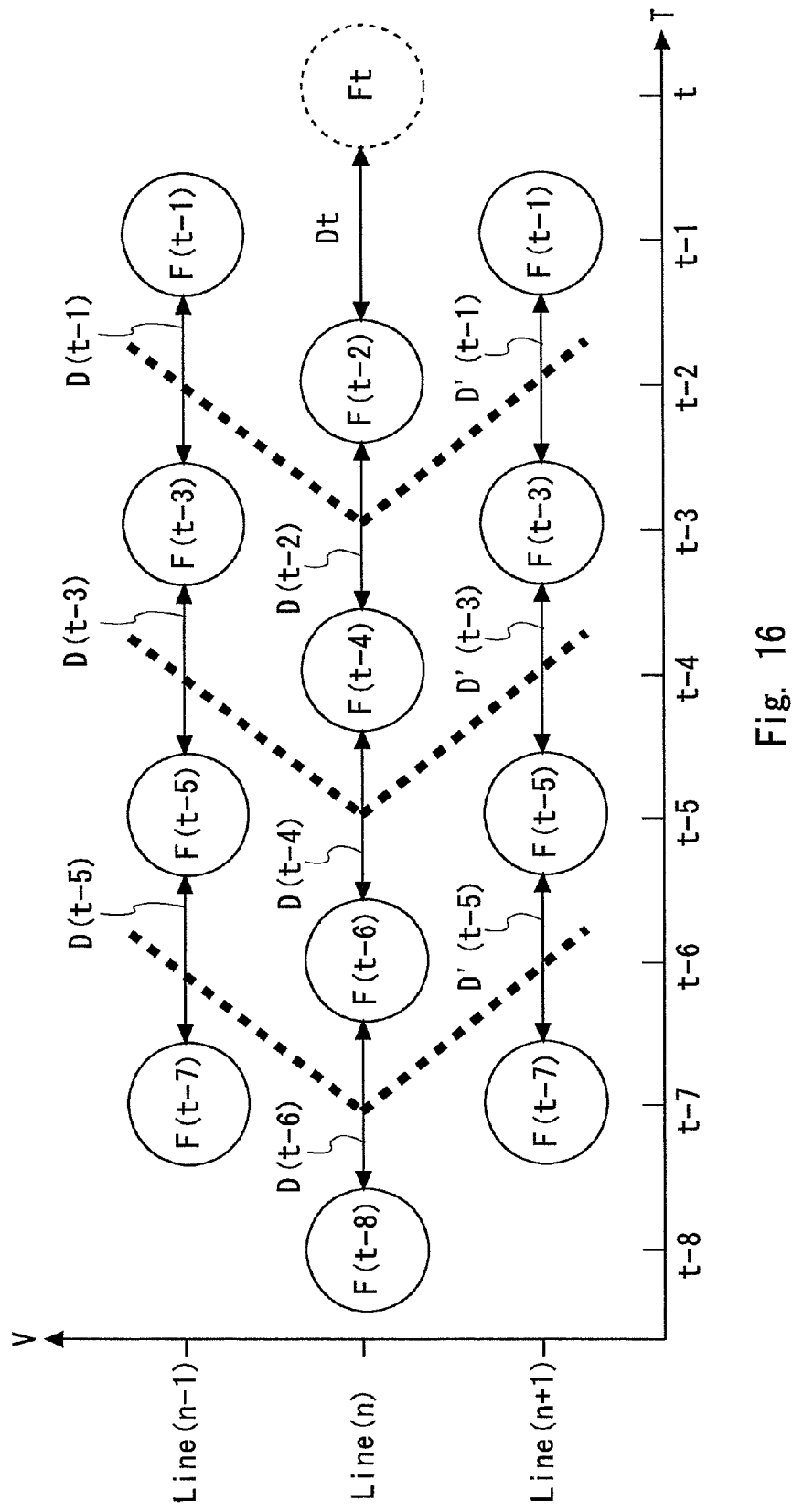
FIG. 16 is a diagram for describing a process of a first determination part in the image processing device shown in FIG. 9.

The first determination part 380 focuses on the pixel position other than the "still" pixel position where all the motion parameters are "0" and the "fast motion" pixel position where all the motion parameters are "1", and determines the noted pixel position in which the arrangement pattern of the motion parameters D(t−1), D(t−3), D(t−5), the arrangement pattern of the motion parameters D(t−2), D(t−4), D(t−6), and the arrangement pattern of the D'(t−1), D'(t−3), D'(t−5) shown in FIG. 16 match with each other as the characteristic position. The first determination part 380 performs determination on all the noted pixel positions in the field group G(t−1) to output the signal indicating that the noted pixel position is the characteristic position to the counter 382 every time the determination result is obtained indicating that the noted pixel position is the characteristic position. The first determination part 380 outputs a completion signal to the counter 382 when the determination has been completed on all the noted picture elements in the field group G(t−1).

The counter 382 counts the number of characteristic positions. Then upon receiving the completion signal from the first determination part 380, the counter 382 outputs the count number which is the total number of characteristic positions to the second determination part 384 and resets the count number.

Upon completion of the determination for the field group G(t−1), the first determination part 380 performs determination for the next field group Gt(F(t) to F(t−7)). At this time, as shown in FIG. 17, the motion parameter other than the motion parameter D(t−6) in the log arrangement from the log processing part 340 is used.

Figure 17:
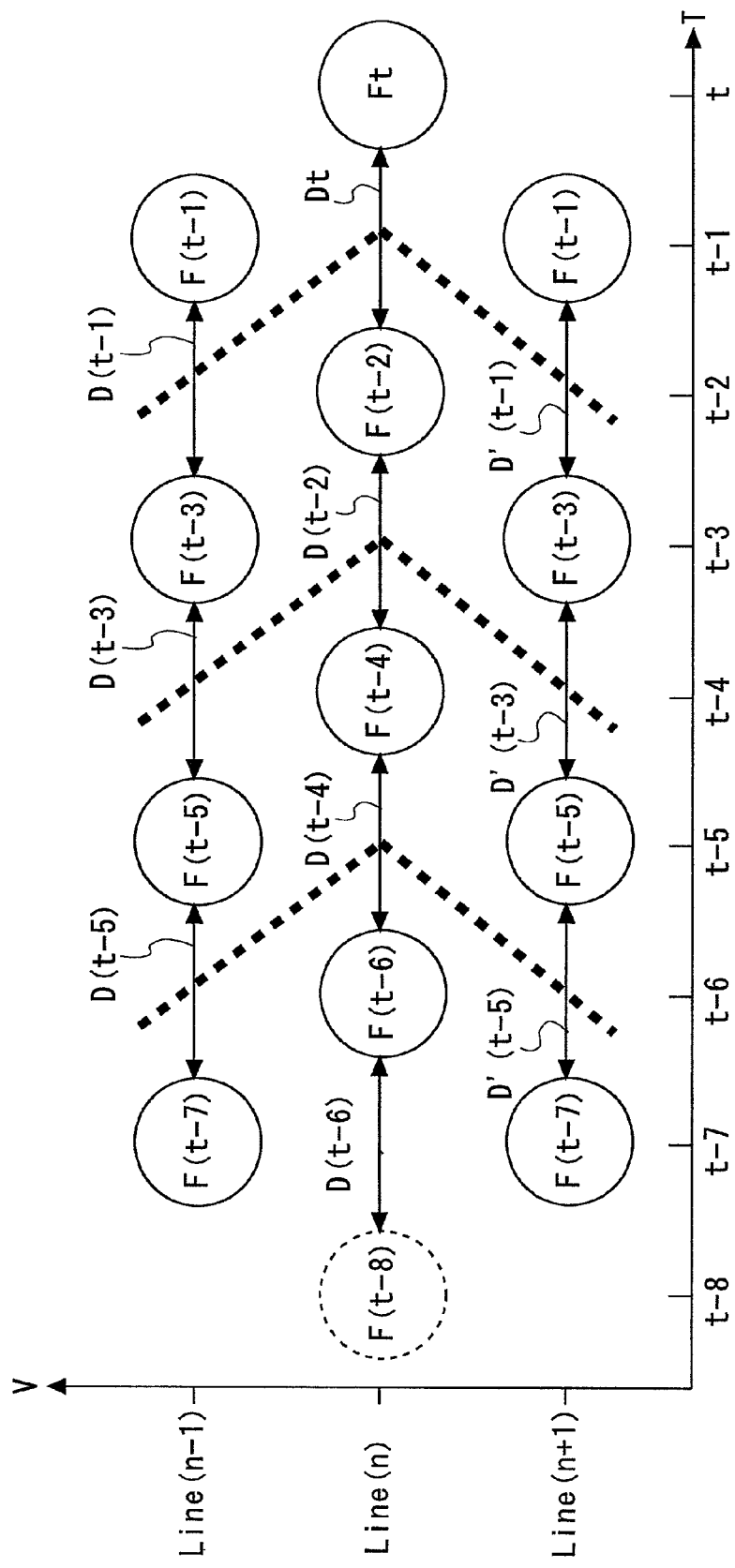
FIG. 17 is another diagram for describing a process of a second determination part in the image processing device shown in FIG. 9.
Figure 18:
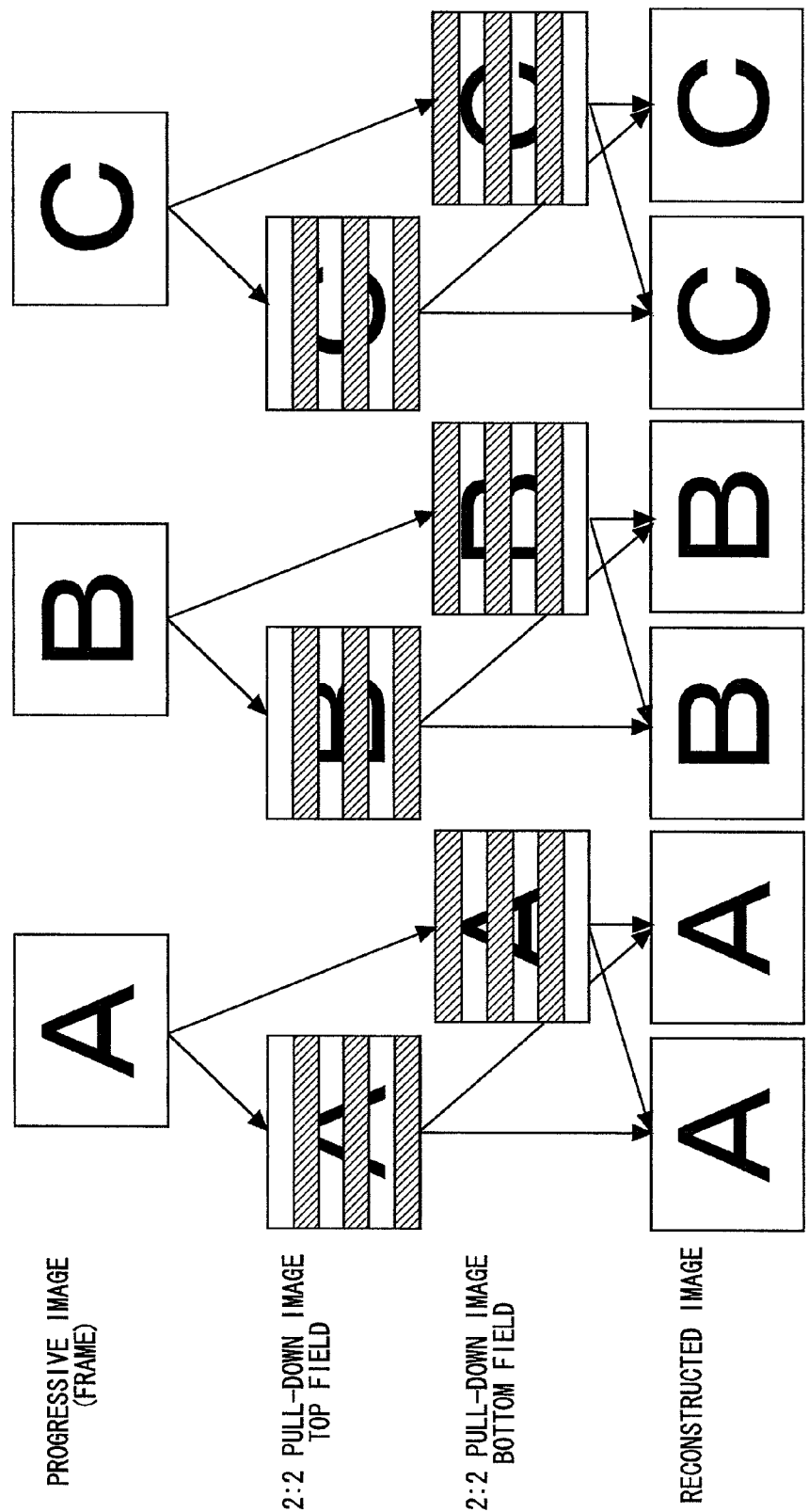
FIG. 18 is a diagram for describing the necessity for detecting a 2:2 pull-down image.
Figure 19:
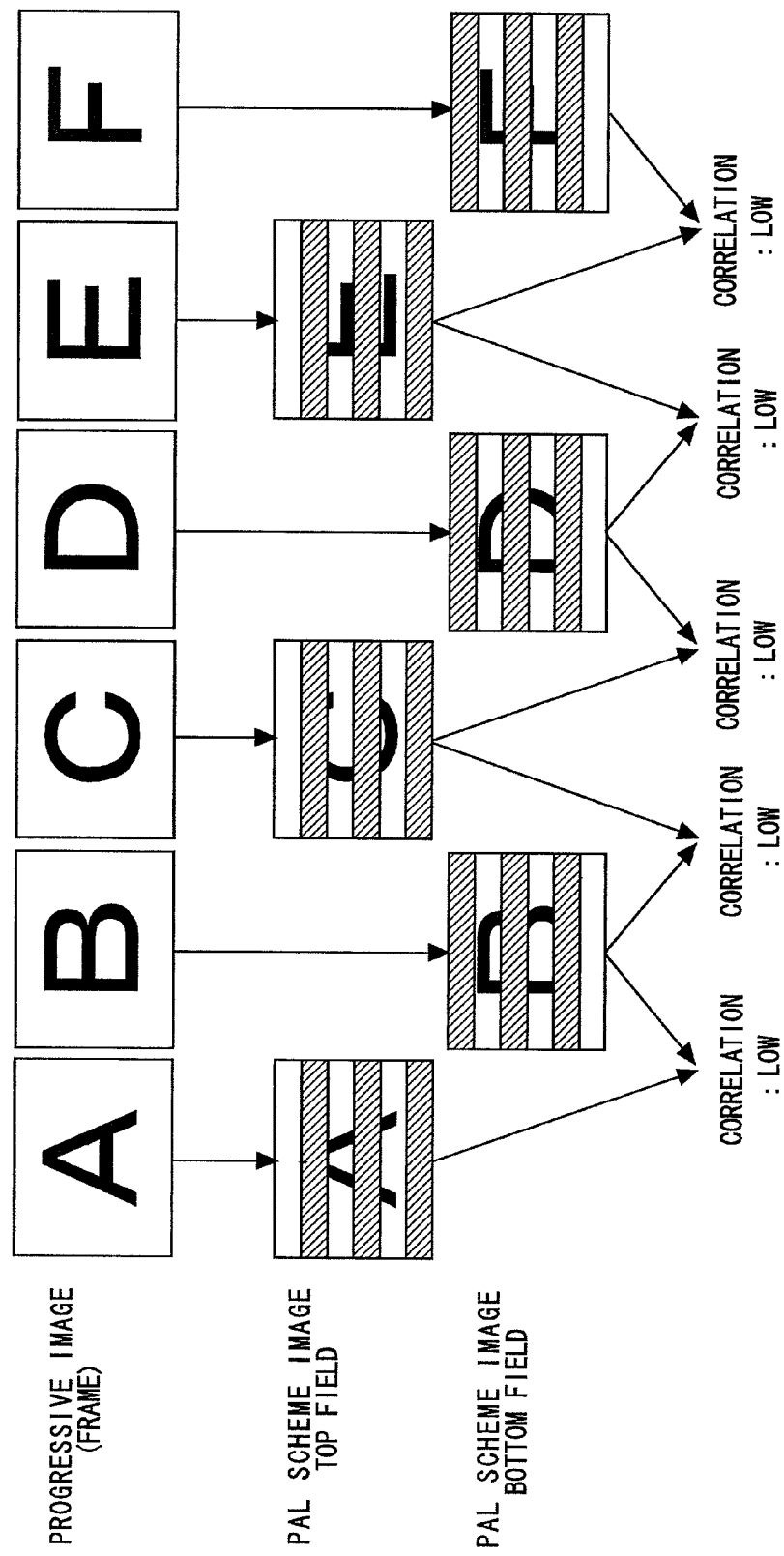
FIG. 19 is a diagram for describing a related art.
Figure 20:
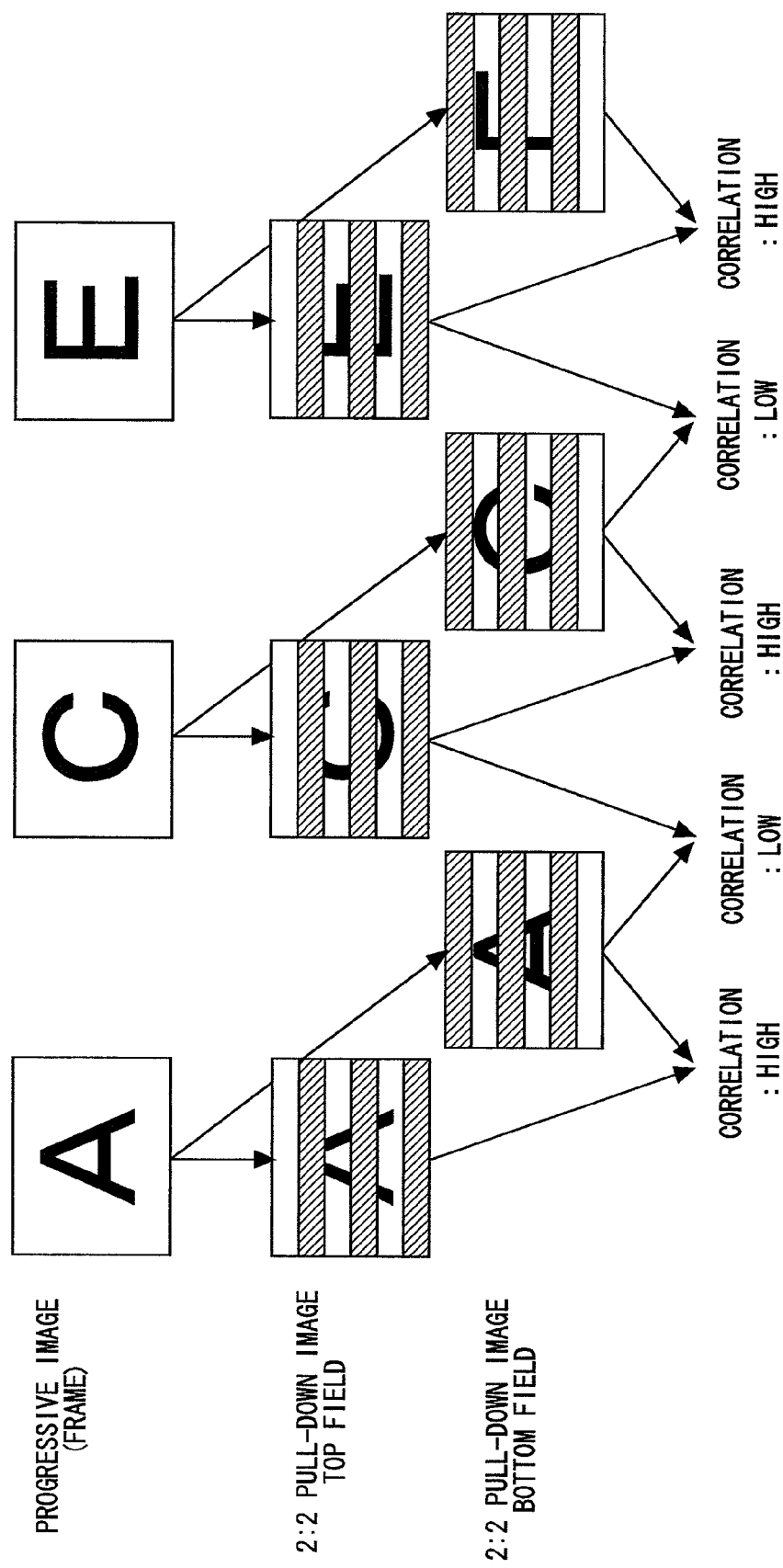
FIG. 20 is another diagram for describing the related art.

The first determination part 380 determines the noted pixel position in which the arrangement pattern of the motion parameters D(t−1), D(t−3), D(t−5), the arrangement pattern of Dt, D(t−2), D(t−4), and the arrangement pattern of D'(t−1), D'(t−3), D'(t−5) shown in FIG. 17 matches as the characteristic position. Other processing are the same as the processing for the field group G(t−1); therefore, the description is omitted here.

The first determination part 380 also performs the same processings for the field groups G(t+1), G(t+2), . . . .

The second determination part 384 determines the input image as the 2:2 pull-down image when the magnitude relation between Sj and S(j+1) and the magnitude relation between S(j+1) and S(j+2) are reversed with each other for all the total number of characteristic positions Sj obtained for these continuous field groups. For example, when "magnitude relation between total number of characteristic positions S(t−1) and St of the field groups G(t−1) and Gt", "magnitude relation between total number of characteristic positions St and S(t+1) of the field groups Gt and G(t+1)", "magnitude relation between S(t+1) and S(t+2)", and "magnitude relation between S(t+2) and S(t+3)" are "large, small", "small, large", "large, small", and "small, large" or "small, large", "large, small", "small, large", and "large, small", the input image is determined as the 2:2 pull-down image.

On the other hand, when all the total number of characteristic positions Sj calculated for the continuous field groups are almost the same value, the input image is determined as the normal interlaced image which is not the 2:2 pull-down image.

The specific exemplary embodiment of the present invention has been described above. The exemplary embodiment described above is merely one example, and various changes or alternations may be made without departing from the spirit of the present invention. Even in this case, the variant example may be within the present invention, as will be understood by a person skilled in the art.

For example, the first determination part 380 in the image processing device 300 employs the line logs of three lines in the exemplary embodiment as shown in FIGS. 16 and 17. However, only the motion parameters Dt, D(t−2), D(t−4), D(t−6) of the line (n) calculated from the field pair having the same attribute as the field Ft and the motion parameters D(t−

1), D(t−3), D(t−5) of the line (n−1), which is the upper next line of the line (n), obtained from the field pair having the different attribute from the field Ft, or alternatively, only the motion parameters Dt, D(t−2), D(t−4), D(t−6) and the motion parameters D'(t−1), D'(t−3), D'(t−5) of the line (n+1), which is the lower next line of the line (n), obtained from the field pair having the different attribute from the field Ft may be employed.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An image processing device, comprising:
  a field pair correlation acquisition part obtaining a correlation for a field group Gt formed of a field Ft of a timing t and five or more fields F(t−i) (i=1 to m, m≧5) which are continuous with the field Ft in time series in an input image for each field pair Pj (j=t to "t−m+2") formed of two adjacent fields having the same attribute; and
  a first determination part determining the input image as a 2:2 pull-down image based on a determination condition, the determination condition being that a pattern in which the correlation of each of the field pairs of a first attribute changes along with a time direction matches a pattern in which the correlation of each of the field pairs of a second attribute changes along with the time direction, wherein
  the field pair correlation acquisition part obtains correlation information indicating existence of correlation for each pixel position for each field pair, and
  the first determination part determines a noted pixel position as a characteristic position having a characteristic of the 2:2 pull-down image based on a determination condition, the noted pixel position being each pixel position other than a pixel position in which the correlation information obtained for all the field pairs included in the field group Gt has the same value, the determination condition being that an arrangement pattern of the correlation information of the noted pixel position of each field pair having the same attribute as the field pair Pt along with the time direction matches an arrangement pattern of the correlation information of the pixel position of an upper next and/or a lower next of the noted pixel position of each field pair having different attribute from the field pair Pt along with the time direction, the image processing device further comprising:
  a counter calculating a total number of noted pixel positions determined as the characteristic position for the field group Gt as a total number of characteristic positions St; and
  a second determination part determining the input image in which a difference or a ratio of the two total number of characteristic positions St obtained for two continuous field groups Gt (t="m+1" to "m+2") is equal to or larger than a predetermined threshold value as the 2:2 pull-down image;
  wherein each of the field pairs of the first attribute are one of an even field and an odd field, and each of the field pairs of the second attribute are the other of an even field and an odd field.

2. The image processing device according to claim 1, wherein the second determination part determines the input image in which a magnitude relation between St and S(t+1) and a magnitude relation between S(t+1) and S(t+2) are reversed from each other for the n total number of characteristic positions St obtained for three or more continuous field groups Gt (t="m+1" to "m+n", n≧3)) as the 2:2 pull-down image.

3. The image processing device according to claim 1, wherein the first determination part determines the noted pixel position in which the correlation information of field pairs Pk (k=t−"2×L", L: integer from 0) and P(k−1) for the field group Gt are identical with each other as the characteristic position satisfying the determination condition.

4. The image processing device according to claim 2, wherein the first determination part determines the noted pixel position in which the correlation information of field pairs Pk (k=t−"2×L", L: integer from 0) and P(k−1) for the field group Gt are identical with each other as the characteristic position satisfying the determination condition.

5. The image processing device according to claim 1, wherein the field pair correlation acquisition part detects motion for each pixel position for each of the field pair Pj to acquire motion parameter indicating existence of the motion as the correlation information of the pixel position.

6. The image processing device according to claim 2, wherein the field pair correlation acquisition part detects motion for each pixel position for each of the field pair Pj to acquire motion parameter indicating existence of the motion as the correlation information of the pixel position.

7. The image processing device according to claim 3, wherein the field pair correlation acquisition part detects motion for each pixel position for each of the field pair Pj to acquire motion parameter indicating existence of the motion as the correlation information of the pixel position.

8. The image processing device according to claim 4, wherein the field pair correlation acquisition part detects motion for each pixel position for each of the field pair Pj to acquire motion parameter indicating existence of the motion as the correlation information of the pixel position.

9. The image processing device according to claim 5, wherein the field pair correlation acquisition part comprises:
  a difference calculator calculating a difference between two fields forming the field pair Pj for each of the field pair Pj; and
  a motion determination part obtaining the motion parameter of each pixel position by determining as "motion" for the pixel position in which an absolute value of the difference calculated by the difference calculator is equal to or more than a predetermined threshold value and "motionless" for the pixel position in which the absolute value of the difference is less than the threshold value.

10. The image processing device according to claim 6, wherein the field pair correlation acquisition part comprises:
  a difference calculator calculating a difference between two fields forming the field pair Pj for each of the field pair Pj; and
  a motion determination part obtaining the motion parameter of each pixel position by determining as "motion" for the pixel position in which an absolute value of the difference calculated by the difference calculator is equal to or more than a predetermined threshold value and "motionless" for the pixel position in which the absolute value of the difference is less than the threshold value.

11. The image processing device according to claim 7, wherein the field pair correlation acquisition part comprises:
a difference calculator calculating a difference between two fields forming the field pair Pj for each of the field pair Pj; and
a motion determination part obtaining the motion parameter of each pixel position by determining as "motion" for the pixel position in which an absolute value of the difference calculated by the difference calculator is equal to or more than a predetermined threshold value and "motionless" for the pixel position in which the absolute value of the difference is less than the threshold value.

12. The image processing device according to claim 8, wherein the field pair correlation acquisition part comprises:
a difference calculator calculating a difference between two fields forming the field pair Pj for each of the field pair Pj; and
a motion determination part obtaining the motion parameter of each pixel position by determining as "motion" for the pixel position in which an absolute value of the difference calculated by the difference calculator is equal to or more than a predetermined threshold value and "motionless" for the pixel position in which the absolute value of the difference is less than the threshold value.

13. An image processing device comprising:
a field pair correlation acquisition part that receives an input image comprising a first frame, a second frame, and a third frame, and obtains a first correlation between a first field of the first frame and a first field of the second frame, a second correlation between the first field of the second frame and a first field of the third frame, a third correlation between a second field of the first frame and a second field of the second frame, and a fourth correlation between the second field of the second frame and a second field of the third frame; and
a first determination part that determines whether the input image is a 2:2 pull-down image based on whether a pattern in which the first correlation changes with respect to the second correlation matches a pattern in which the third correlation changes with respect to the fourth correlation.

14. The image processing device according to claim 13, wherein the first field of the first frame, the first field of the second frame, and the first field of the third frame are odd fields; and
wherein the second field of the first frame, the second field of the second frame, and the second field of the third frame are even fields.

15. A method of detecting a 2:2 pull-down image using an image processing device, the method comprising:
receiving an input image comprising a first frame, a second frame, and a third frame;
obtaining a first correlation between a first field of the first frame and a first field of the second frame, a second correlation between the first field of the second frame and a first field of the third frame, a third correlation between a second field of the first frame and a second field of the second frame, and a fourth correlation between the second field of the second frame and a second field of the third frame; and
determining, by the image processing device, whether the input image is a 2:2 pull-down image based on whether a pattern in which the first correlation changes with respect to the second correlation matches a pattern in which the third correlation changes with respect to the fourth correlation.

16. The method according to claim 15, wherein the first field of the first frame, the first field of the second frame, and the first field of the third frame are odd fields; and
wherein the second field of the first frame, the second field of the second frame, and the second field of the third frame are even fields.

* * * * *